United States Patent
Nagasaka

(10) Patent No.: US 8,322,468 B2
(45) Date of Patent: Dec. 4, 2012

(54) ROBOT APPARATUS AND METHOD OF CONTROLLING THE SAME, AND COMPUTER PROGRAM

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 12/698,550

(22) Filed: Feb. 2, 2010

(65) Prior Publication Data

US 2010/0206651 A1  Aug. 19, 2010

(30) Foreign Application Priority Data

Feb. 18, 2009  (JP) .................... P2009-035168

(51) Int. Cl.
*B62D 57/00* (2006.01)

(52) U.S. Cl. .............................. 180/7.1; 901/1

(58) Field of Classification Search ............. 180/218, 180/7.1, 21, 168; 901/1, 9; 700/245, 261
See application file for complete search history.

(56) References Cited

U.S. PATENT DOCUMENTS

| | | | | |
|---|---|---|---|---|
| 2008/0309273 A1* | 12/2008 | Kamiya | | 318/563 |
| 2011/0137456 A1* | 6/2011 | Koselka et al. | | 700/245 |
| 2011/0218673 A1* | 9/2011 | Oga et al. | | 700/254 |
| 2011/0295164 A1* | 12/2011 | Jacobsen et al. | | 601/23 |
| 2012/0061155 A1* | 3/2012 | Berger et al. | | 180/21 |
| 2012/0158181 A1* | 6/2012 | Seo | | 700/261 |

FOREIGN PATENT DOCUMENTS

| | | |
|---|---|---|
| JP | 06-079656 | 3/1994 |
| JP | 2000-288966 | 10/2000 |
| JP | 2007-257200 | 10/2007 |

OTHER PUBLICATIONS

Khatib, O. et al., "Vehicle/Arm Coordination and Multiple Mobile Manipulator Decentralizer Cooperation", (Proc.of IEEE/RSJ Intl. Conf. on Intelligent Robots and Systems, IROS, pp. 546-553, 1996.

Hirata, Y. et al., "Transportation of a Single Object by Multiple Distributed Robot Helpers with Caster-like Dynamics) (DR Helpers) in Cooperation with a Human", JRSJ, vol. 21, No. 7, pp. 776-784, 2003.

Nagasaka, K. et al., "Motion Control of a Virtual Humanoid that can Perform Real Physical Interactions with a Human", Proc.of IEEE/RSJ Intl. Conf. on Intelligent Robots and Systems, IROS, pp. 2303-2310, 2008.

Sentis, L. et al., "A Whole-Body Control Framework for Humanoids Operating in Human Environments", Proc. of IEEE Intl. Conf. on Robotics and Automation, pp. 2641-2648, 2006.

* cited by examiner

*Primary Examiner* — Tashiana Adams
(74) *Attorney, Agent, or Firm* — Finnegan, Henderson, Farabow, Garrett & Dunner, L.L.P.

(57) ABSTRACT

In a robot apparatus having a base unit, a wheel unit of an opposed-two-wheel type mounted on the base unit and having driving wheels drivable so as to face each other, and an upper-body unit provided on an upper portion of the base unit and configured by concatenating one or more joints; a robot apparatus includes an opposed-two-wheel equivalent model, a robot-state observing unit, a control unit performing a control arithmetic operation for the opposed-two-wheel equivalent model, a transforming unit transforming a part of control target values calculated by the control unit to a control target value for the wheel unit, and a joint control unit controlling a joint-driving actuator of the wheel unit and also controlling a joint-driving actuator other than the joint-driving actuator.

7 Claims, 19 Drawing Sheets

161   101R, 101L

ROBOT APPARATUS AND METHOD OF CONTROLLING THE SAME, AND COMPUTER PROGRAM

BACKGROUND OF THE INVENTION

1. Field of the Invention

The present invention relates to a robot apparatus with a wheel mobile mechanism, a method of controlling the robot apparatus, and a computer program and, in particular, to a robot apparatus with a wheel mobile mechanism having non-holonomic constraints that do not allow translational movement in a horizontal direction, such as an opposed-two-wheel type, a method of controlling the robot apparatus, and a computer program.

In more detail, the present invention relates to a robot apparatus with a wheel mobile mechanism having a non-holonomic constraints with respect to an upper body, a method of controlling the robot apparatus, and a computer program. In particular, the present invention relates to a robot apparatus performing a force control in cooperation with the entire body including a wheel mobile mechanism having non-holonomic constraints with an upper body, a method of controlling the robot apparatus, and a computer program.

2. Description of the Related Art

With the onset of a rapidly aging society, a ratio of senior citizens with respect to people who support them is 1:3.3 at present (2005), and is expected to be 1:2.4 in 2015 and then 1:2.1 in 2025. It is an urgent matter to build a society where senior citizens, whose ratio with respect to the composition of population is rapidly increasing as described above, can live with vitality possibly without becoming in need of nursing care and, even if becoming in need of nursing care, they can be prevented as much as possible from becoming in a worsened condition, thereby being able to lead a self-supporting life.

With the onset of such an aging society, in senior nursing facilities and homes with senior citizens, demands for mechatronics devices aiming at mentally and physically assisting the senior citizens are increasing. Also, there are other demands for insertable-type physical supports, such as autonomous-walking assistive devices and power assist for an upper limb, and agent-type physical supports, such as those autonomously moving to carry an object on the floor and do the cleaning.

For example, a robot moves as a leg-mobile type or a wheel type. A leg-mobile robot can support a walking surface with asperities on an operational route, such as a rough terrain or obstacle, and a discontinuous walking surface, such as in ascending or descending stairs or a ladder, thereby performing flexible moving operations. However, the leg-mobile robot has problems, such as the number of joints is increased to incur high cost, the posture is unstable, and walking control is difficult. For example, when the robot topples over, the robot may damage a person with a limp in need of nursing care. By contrast, a wheel-type robot can have a smaller number of joints to suppress cost, the posture is stable, and there is less fear of toppling over.

The mobile mechanism of the wheel type can be broadly divided into an omnidirectional type and a non-holonomic type. "Non-holonomic" means, for example, "the constraint condition of the dynamical system is not integrable", "a drift is present", and "coordinates more than the number of inputs can be controlled". A mobile mechanism of a non-holonomic type is configured with a simple structure, such as opposed two wheels. Although it is difficult for the mobile mechanism to instantaneously advance in a direct horizontal direction (left and right), the mobile mechanism can be manufactured at low cost. For example, the wheel mobile mechanism of an opposed-two-wheel type is adopted in many mobile robots as a practical moving mechanism (for example, refer to Japanese Unexamined Patent Application Publication No. 2007-257200 and Yasuhisa Hirata, Kazuhiro Kosuge, Hajime Asama, Hayato Kaetsu, and Kuniaki Kawabata, "Transportation of a Single Object by Multiple Distributed Robot Helpers with Caster-like Dynamics (DR Helpers) in Cooperation with a Human", Journal of the Robotics Society of Japan, Vol. 21, No. 7, pp. 776-784, 2003).

When a main use is for physical support described above, mechatronics devices perform operations as flexibly and safely making physical contact with the human and complex environment. That is, unlike the situation in which industrial robots in the past perform fixed operation under a familiar environment, the mechatronics device appropriately adjusts a generation force of an actuator by sensing an unfamiliar environment and obtaining an appropriate external force from the surrounding environment varying with time so as to accomplish a target operation (task). Also, a flexible reaction in consideration of safety is expected against an unfamiliar disturbance that can act on every part of the body.

Most of the robots in the past are of a position control type, giving an angle instruction value to a joint-driving actuator to drive the joint so as to follow the instruction value. A robot of a position control type is easy to control, but has trouble with "soft" control with a force or acceleration order. By contrast, a robot of a force-control type directly controls a joint generation force to directly control force, and therefore can provide more-flexible personal physical interaction services of a force order.

As for leg-type robots, several methods of cooperatively using joints of the whole body including a leg joint with multiple degrees of freedom to perform a force interaction at every place of the entire body have been suggested (for example, refer to L. Sentis et al. "A Whole-body Control Framework for Humanoids Operating in Human Environments" (In Proc. IEEE Int. Conf. on Robotics and Automation, 2006, pp. 2641-2648) and K. Nagasaka et al. "Motion Control of a Virtual Humanoid that can Perform Real Physical Interactions with a Human" (In Proc. 2008 IEEE/RSJ International Conference on Intelligent Robots and Systems, 2008, pp. 2303-2310)).

On the other hand, a whole-body cooperative-force interaction method using a wheel mobile mechanism of an opposed-two-wheel type is not necessarily clear. For example, a wheel-type robot apparatus performing a cooperative control of a force order over a mobile base and arms has been suggested (for example, refer to Khatib, O., Yokoi, K., Chang, K., Ruspini, D., Holmberg, R. Casal, A. "Vehicle/Arm Coordination and Multiple Mobile Manipulator Decentralized Cooperation" (Proc. of IEEE/RSJ Int. Conf. Intelligent Robots and Systems, IROS '96, 1996, pp. 546-553)). However, an omnidirectional mobile body is used as a mobile base, and therefore non-holonomic characteristics are not shown.

To built a whole-body cooperative control system in a robot of an opposed-two-wheel type, kinematical constraints of being not able to make a translational move in a horizontal direction (that is, non-holonomic constraints) are considered, thereby posing a complication even with a simple structure. Also, kinematics of a wheel unit and kinematics of an upper limb have different features, and therefore it is difficult to merge them together. The inventor thinks that these problems make it difficult to achieve a whole-body cooperative-force control in an opposed-two-wheel robot.

SUMMARY OF THE INVENTION

It is desirable to provide an excellent robot apparatus with a wheel mobile mechanism having non-holonomic constraints with respect to an upper body, a method of controlling the robot apparatus, and a computer program.

It is also desirable to provide an excellent robot apparatus capable of force control with the entire apparatus including a wheel mobile mechanism having non-holonomic constrains with an upper body, a method of controlling the robot apparatus, and a computer program.

It is further desirable to provide an excellent robot apparatus capable of providing flexible physical services with every part of its whole body in a force interaction with the environment and human, a method of controlling the robot apparatus, and a computer program.

According to an embodiment of the present invention, a robot apparatus has a base unit, a wheel unit of an opposed-two-wheel type mounted on the base unit and having driving wheels drivable so as to face each other, and an upper-body unit provided on an upper portion of the base unit and configured by concatenating one or more joints. The robot apparatus includes an opposed-two-wheel equivalent model obtained by replacement with a wheel equivalent joint representing a degree of freedom of the wheel unit with a degree of freedom of rotation and a degree of freedom of translation of the base unit and by modeling the robot apparatus as a whole as a single manipulator structure, a robot-state observing unit observing a current state of the robot apparatus formed of an angle and an angular velocity of each of the joints of the upper-body unit and an angle and an angular velocity of the wheel unit and reflecting the current state of the robot apparatus onto the opposed-two-wheel equivalent model, a control unit performing a control arithmetic operation for the opposed-two-wheel equivalent model, a transforming unit transforming a part of control target values calculated by the control unit to a control target value for the wheel unit, and a joint control unit controlling a joint-driving actuator of the wheel unit based on the control target value of the wheel unit obtained through the transformation by the transforming unit and also controlling a joint-driving actuator other than the joint-driving actuator of the wheel unit based on a control target value calculated by the control unit.

According to another embodiment of the present invention, the wheel equivalent joint has a degree of freedom of rotation in a rotating direction and a degree of freedom of translation in a back-and-forth direction of the base unit, and the robot-state observing unit calculates a position and a posture of the base unit from the observed angle and the angular velocity of the wheel unit.

According to still another embodiment of the present invention, the control unit calculates a target joint force for each of the joint of the opposed-two-wheel equivalent model of the robot apparatus, and the transforming unit transforms a target joint force for the wheel equivalent joint to a target joint force for the wheel unit.

According to yet another embodiment of the present invention, the control unit calculates a virtual force acting on the opposed-two-wheel equivalent model to obtain a motion target of the robot apparatus, and transforms the virtual force to a target joint force equivalent to the virtual force.

According to yet another embodiment of the present invention, the robot apparatus further includes an operating-force detecting means for detecting an acting force in a joint driving direction in at least a part of the joints, and the joint control unit performs a force control over the joints.

Here, according to yet another embodiment of the present invention, when a target joint force, an acting force in a joint driving direction, and a joint driving speed are given, the joint control unit may determine an instruction joint force to the joint-driving actuator based on an ideal response model of the joint-driving actuator defining a relation of a joint acceleration target value obtained by the joint-driving actuator ideally making a response, and may perform a force control over the joints.

According to yet another embodiment of the present invention, a method of controlling a robot apparatus having a base unit, a wheel unit of an opposed-two-wheel type mounted on the base unit and having driving wheels drivable so as to face each other, and an upper-body unit provided on an upper portion of the base unit and configured by concatenating one or more joints. The method includes the steps of setting a motion target of the robot apparatus, obtaining a joint value and a joint speed of each joint-driving actuator, calculating, based on joint values of left and right wheel-driving actuators, a joint value and a joint speed of a wheel equivalent joint representing a degree of freedom of the wheel unit with a degree of freedom of rotation and a degree of freedom of translation of the base unit, and setting all joint values and joint speeds in an opposed-two-wheel equivalent model formed by replacing the wheel unit of the robot apparatus to the wheel equivalent joints, finding a virtual force for obtaining the motion target, transforming the virtual force to a real force, and calculating an external force and a request torque for all of the joints in the opposed-two-wheel equivalent model, transforming a request torque to the wheel equivalent joint to a request torque to the left and right driving wheels of the wheel unit, and performing a torque control for each of the joints according to the obtained request torque.

According to yet another embodiment of the present invention, a computer program described in a computer readable format so as to cause a process to be performed on a computer, the process for controlling the robot apparatus having a base unit, a wheel unit of an opposed-two-wheel type mounted on the base unit and having driving wheels drivable so as to face each other, and an upper-body unit mounted on an upper portion of the base unit and configured by concatenating one or more joints. The program causes the computer to function as a robot-state observing unit observing a current state of the robot apparatus formed of an angle and an angular velocity of each of the joints of the upper-body unit and an angle and an angular velocity of the wheel unit and reflecting the current state of the robot apparatus onto an opposed-two-wheel equivalent model obtained by replacement with a wheel equivalent joint representing a degree of freedom of the wheel unit with a degree of freedom of rotation and a degree of freedom of translation of the base unit, a control unit performing a control arithmetic operation for the opposed-two-wheel equivalent model, a transforming unit transforming a part of control target values calculated by the control unit to a control target value for the wheel unit, and a joint control unit controlling a joint-driving actuator of the wheel unit based on the control target value of the wheel unit obtained through the transformation by the transforming unit and also controlling a joint-driving actuator other than the joint-driving actuator of the wheel unit based on a control target value calculated by the control unit.

The computer program according to the above embodiment of the present invention is defined so as to be written in a computer readable format so that a predetermined process is performed on the computer. In other words, by installing the computer program according to the embodiment above on the computer, cooperative operations can be performed on the computer, and operations and effects similar to those of the robot apparatus according to the embodiment described first can be obtained.

According to the embodiments of the present invention, it is possible to provide an excellent robot apparatus capable of performing a force control in cooperation with the entire body including a wheel mobile mechanism having non-holonomic constraints with an upper body, a method of controlling the robot apparatus, and a computer program.

Unlike robots of a position control type seen in the past, the mobile robot according to the embodiments of the present invention can provide flexible physical services with every part of its whole body in a force interaction with the environment and human.

According to the embodiments described first, last but one, and last, the robot-state observing unit makes a replacement with an equivalent joint representing a degree of the wheels, a degree of freedom of rotation, and a degree of freedom of translation of the mobile unit formed of opposed two wheels, thereby modeling the robot apparatus as a whole as an opposed-two-wheel equivalent model having a branched single manipulator structure and reflecting the current state of the robot apparatus onto this opposed-two-wheel equivalent model. Therefore, according to the other embodiment to the yet other embodiment described first, a control arithmetic operation is performed by using this opposed-two-wheel equivalent model. Also, by transforming a part of the calculated control target values to a control target value for the wheels, a whole-body cooperative-force control can be performed in the robot apparatus having an opposed-two-wheel mobile mechanism.

According to the embodiments described first, last but one, and last, even a robot apparatus of a wheel-mobile type can cooperate the wheels and the arms to more efficiently perform a task, or can complementarily use the degrees of freedom of the wheels and the arms (performing a force interaction of a freedom component not included in the upper limb by using the degree of freedom of the wheels or performing a motion of a component not included in the degree of freedom of the wheels by using the degree of freedom of the upper limb). That is, the robot apparatus according to these embodiments has a simple mobile mechanism compared with a leg-mobile robot, but can flexibly perform various tasks.

According to the embodiments described fifth and sixth, at least a part of the joint-driving actuators is provided with a torque sensor that detects an external torque of a motor on an output axis of a decelerator. This joint-driving actuator is a virtualization actuator that determines a driving force for instruction to a joint based on an ideal response model of the actuator, when the joint-driving actuator is force-controlled according to a torque instruction value. With this, the mobile robot can suitably perform a force interaction with the environment and human.

Further features and advantages of the present invention will become apparent by more detailed description based on embodiments described below and the attached drawings.

DESCRIPTION OF THE PREFERRED EMBODIMENTS

The mobile robot according to embodiments of the present invention, which is different from robots of a position control type often seen in the past, provides flexible physical services with every part of its whole body in a force interaction with the environment and human. Thus, motion instructions regarding force, acceleration, speed, positional dimension at an arbitrary part of the body are typically provided flexibly.

In the following, with reference to the drawings, embodiments of the present invention regarding a wheel-mobile-type robot are described in detail.

Figure 1A:
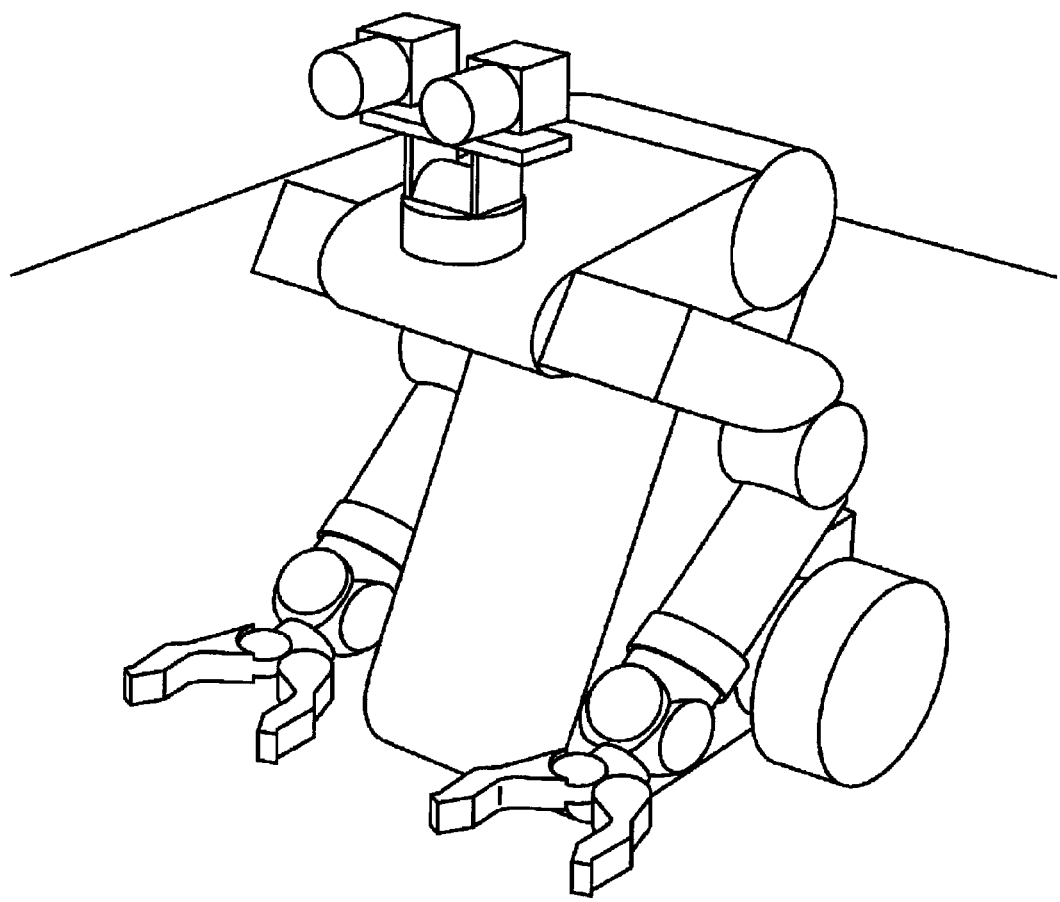
FIG. 1A is an external view of an opposed-two-wheel mobile robot according to an embodiment of the present invention.
Figure 1B:
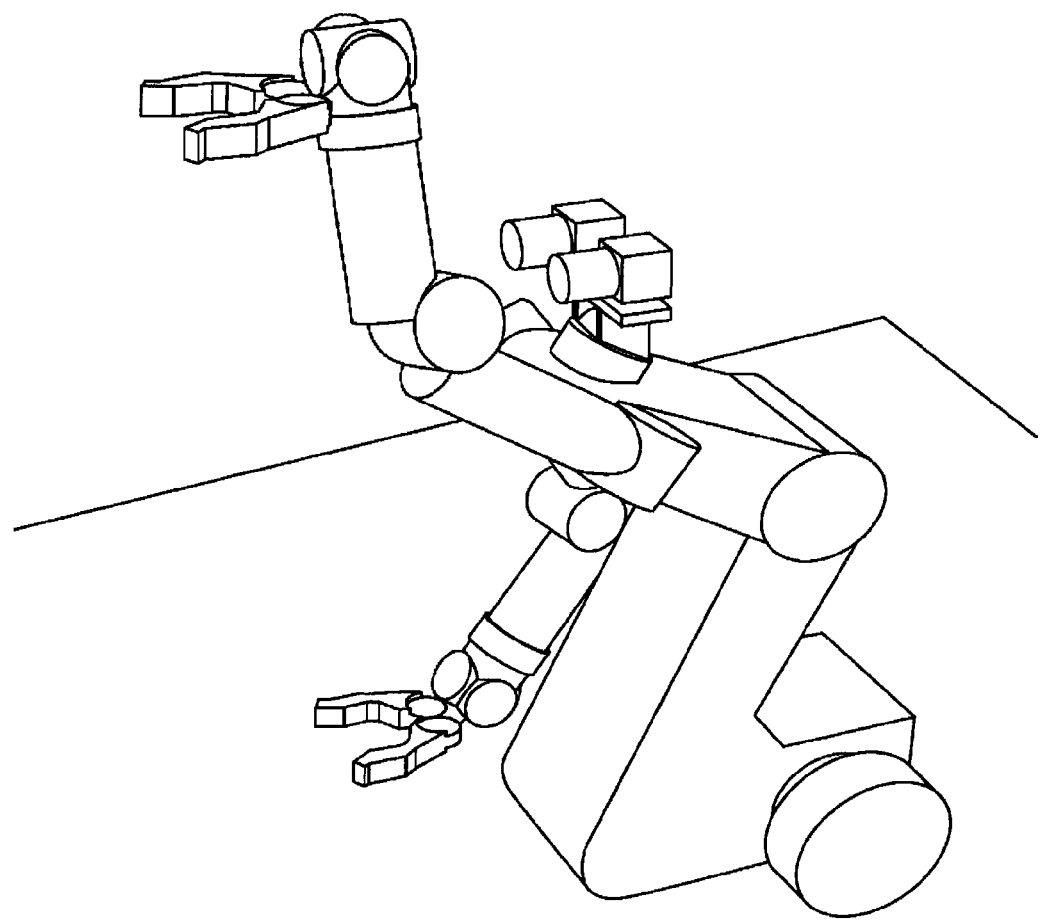
FIG. 1B is an external view of the opposed-two-wheel mobile robot according to an embodiment of the present invention.
Figure 1C:
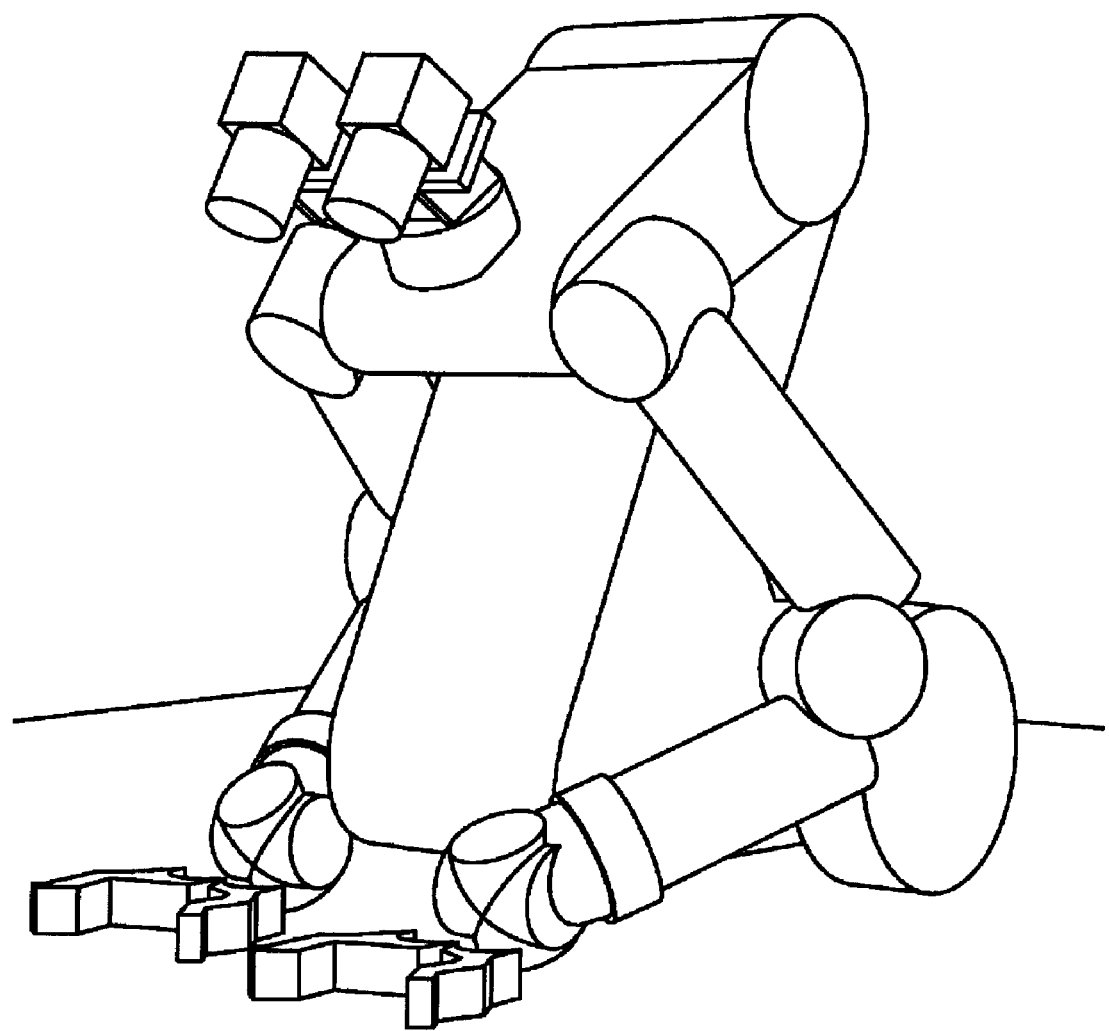
FIG. 1C is an external view of the opposed-two-wheel mobile robot according to an embodiment of the present invention.
Figure 2:
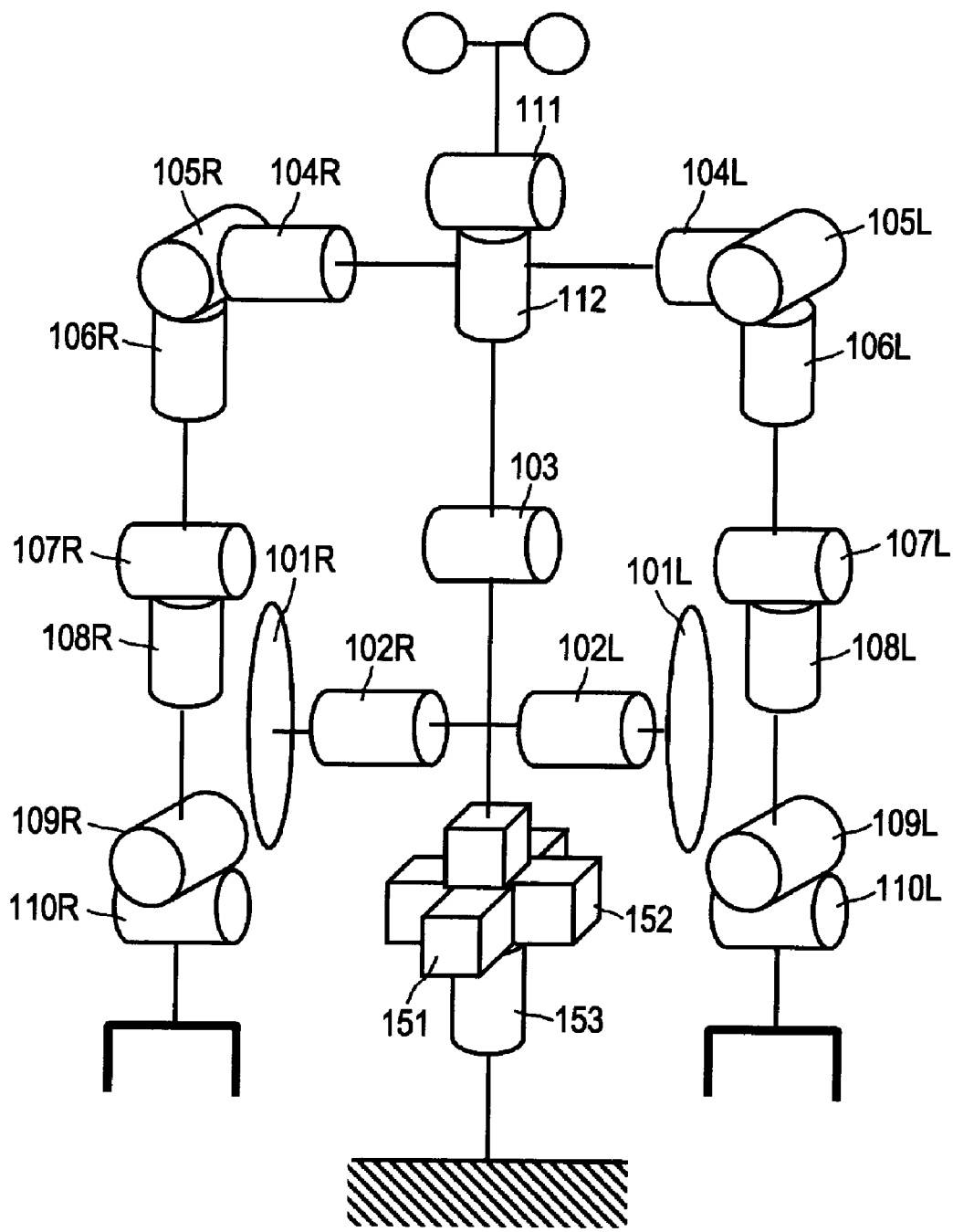
FIG. 2 illustrates the structure of degrees of freedom at joints (modeled with a wheel mechanism as positive) of the mobile robot depicted in FIGS. 1A to 1C.

FIGS. 1A to 1C are external views of an opposed-two-wheel mobile robot according to embodiments of the present invention. FIG. 2 illustrates the structure of degrees of freedom at joints of this mobile robot.

The depicted mobile robot includes, on a base unit, two opposed driving wheels 101R and 101L as a moving unit, which are driven by driving-wheel actuators 102R and 102L that each rotate around a pitch axis. Here, in FIG. 2, reference numerals 151, 152, and 153 are minor driving joints that actually do not exist, corresponding to a translational degree of freedom in an X direction (back-and-forth direction), a translational degree of freedom in a Y direction (horizontal direction), and a rotational degree of freedom around a yaw axis with respect to a floor surface of the mobile robot, respectively, and representing that the mobile robot can locomote over a virtual world.

The moving unit is connected to an upper body via a hip joint. The hip joint is driven by a hip-joint pitch-axis actuator 103 that rotates around a pitch axis. The upper body is configured of two arm units, left and right, and a head unit connected via a neck joint. The left and right arm units are each assumed to have seven degrees of freedoms: three degrees of freedom at a shoulder joint, two degrees of freedom at an elbow joint, and two degrees of freedom at a wrist joint. The three degrees of freedom at the shoulder joint are driven by shoulder-joint pitch-axis actuators 104R and 104L, shoulder-joint roll-axis actuators 105R and 105L, and shoulder-joint yaw-axis actuators 106R and 106L. The two degrees of freedom at the elbow joint are driven by elbow-joint pitch-axis actuators 107R and 107L and elbow-joint yaw-axis actuators 108R and 108L. The two degrees of freedom at the wrist joint are driven by wrist-joint roll-axis actuators 109R and 109L and wrist-joint pitch-axis actuators 110R and 110L. The two degrees of freedom at the wrist joint are also driven by wrist-joint pitch-axis actuators 111R and 111L and neck-joint yaw-axis actuators 112R and 112L.

The actuator for each axis has mounted thereon an encoder for measuring a joint angle, a motor for generating a torque, a motor driver of a current control type for driving the motor, and also a decelerator for achieving a sufficient generation force. The actuator is also provided with a microcomputer for drive control over the actuator (any of these components mentioned above are not shown).

The operation of the entire mobile robot is subjected to centralized control by a host computer (not shown). The host computer can communicate with the microcomputer on each axis, and can give a torque target for the actuator on each axis. The microcomputer can transmit to the host computer a current output torque, joint angle, and joint angular velocity at the actuator. On the host computer, a control arithmetic operation is performed for whole-body cooperation, thereby calculating a torque target value for each joint.

In general, unknown physical parameters that are difficult to model or identify, such as friction and inertia, are present at a joint part of the robot. Due to such unknown parameters, even if the current control is performed over the motor, it may be difficult to generate a predetermined torque. Also, the generated torque may not produce a theoretically-expected response, thereby preventing a sufficient force control. To solve these problems, a virtualization actuator for making an ideal response to an instruction for a generated torque and to an external torque can be applied, which is disclosed in, for example, Japanese Patent Application Publication No. 2008-119508, which has already been assigned to Sony Corporation.

In the actuator, a torque sensor that detects an external torque of a motor is placed on an output axis of a decelerator. When the joint-driving actuator is subjected to force control according to a torque instruction value, a driving force for a joint is determined based on an ideal response model of the actuator (Here, the ideal response model is configured of a quadratic differential equation defining a relation among a torque instruction value, external torque, and a joint-angle acceleration target value achieved by the actuator ideally making a response when a joint angular velocity obtained by differentiating the joint angle with time is given).

With the ideal actuator being applied to every joint, the mobile robot can suitably perform a force interaction with the environment and human. However, the spirit and scope of an embodiment of the present invention is not meant to be restricted to a method of configuring a specific actuator.

Next, the mechanism of a mobile base is described with reference to FIG. 3. As depicted in an upper portion of FIG. 3, a caster 161 is mounted on the base unit, in addition to the right and left driving wheel 101R and 101L, which form an opposed two-wheel mechanism. Thus, the base unit can be typically kept horizontal to a floor surface.

Figure 3:
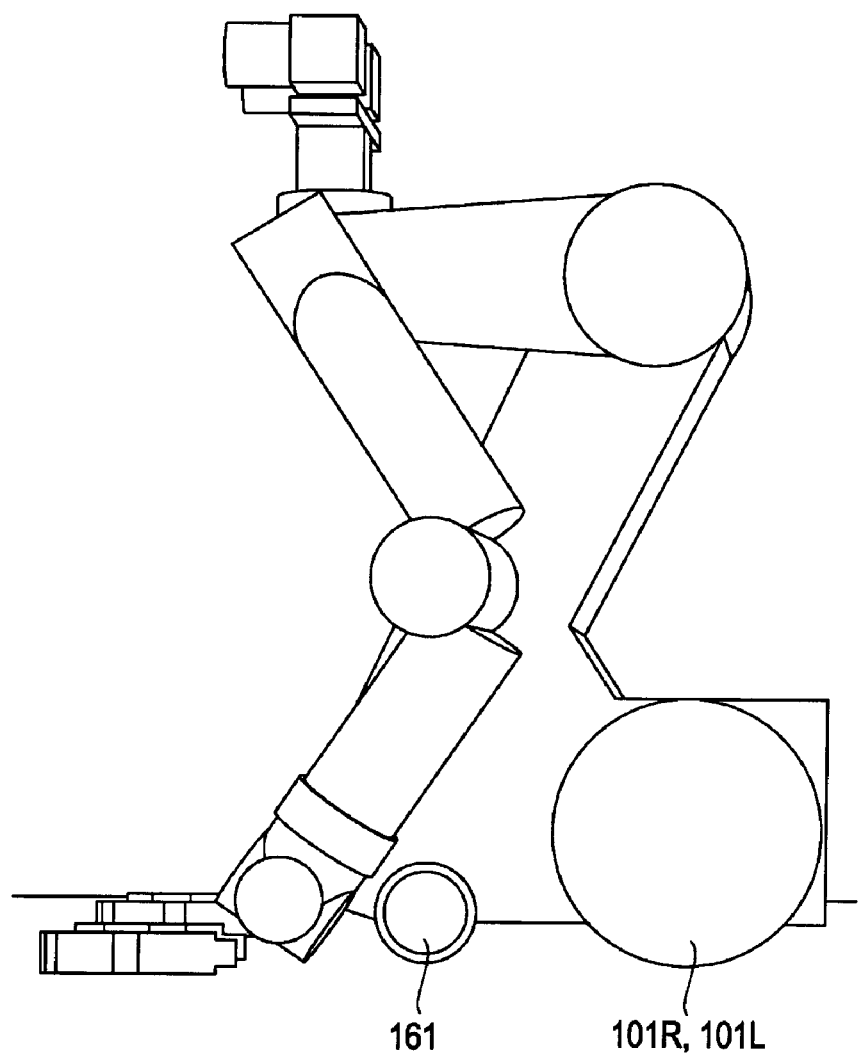
FIG. 3 illustrates a mechanism of a mobile base.
Figure 3:
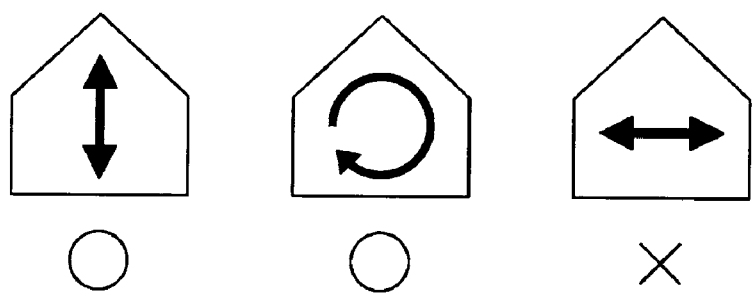

In a lower portion of FIG. 3, the base unit is depicted from above to show its movable directions. With the right and left driving wheels 101R and 101L rotating at the same rotating speed in the same rotating direction, the base unit can move in a back-and-forth direction, as depicted at left in FIG. 3. When the rotating speeds of the right and left driving wheels 101R and 101L are different from each other, the base unit turns right or left. When the rotating directions of the right and left driving wheels 101R and 101L are different from each other, the base unit rotates around a yaw axis, as depicted at the center in FIG. 3. In this manner, the opposed two-wheel mechanism can move in back-and-forth and rotating directions, but is difficult to move in a horizontal direction, as depicted at right in FIG. 3.

As depicted in the lower portion of FIG. 3, although inputs to the opposed two-wheel mechanism are at two degrees of freedom from the right and left driving wheels 101R and 101L, three degrees of freedom, that is, an arbitrary position (x; y) and an azimuth (around a yaw axis) in a two-dimensional plane, can be controlled. As such, constraints capable of controlling coordinates more than the number of inputs are called non-holonomic constraints.

Figure 4:
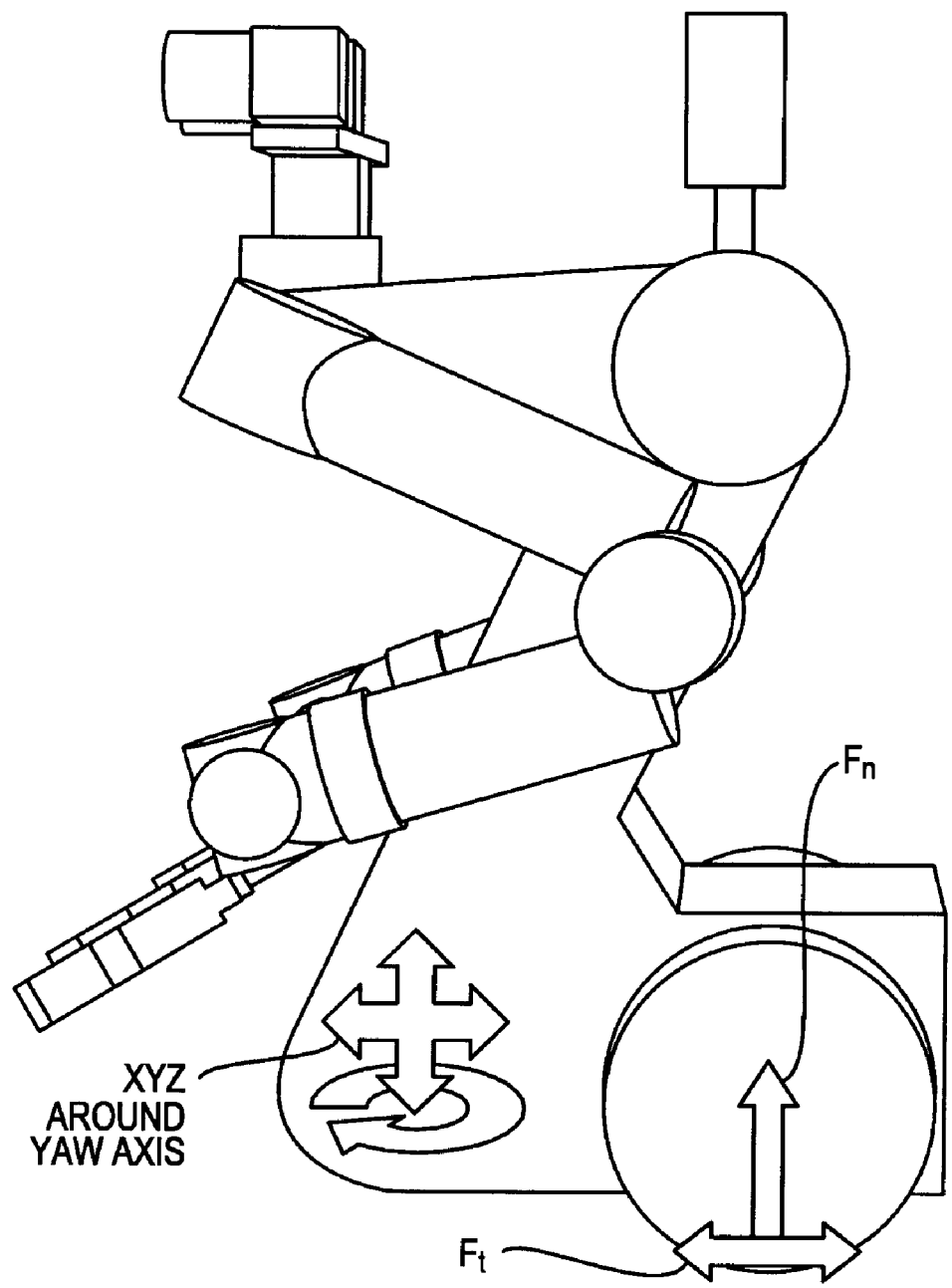
FIG. 4 illustrates degrees of freedom at joints of an actual wheel mechanism and external forces.

The structure of degrees of freedom at joints has translational degrees of freedom and a rotational degree of freedom indicated by reference numerals 151, 152, and 153 in FIG. 2 with respect to the actual wheel mechanism. These take external forces acting on the wheels as variables. In a modeling method faithful to the actual structure (modeling the wheel mechanism as positive), as depicted in FIG. 4, the translational degrees of freedom in the X and Y directions and rotational degree of freedom around the yaw axis of the opposed two wheels, and a floor reaction force $F_n$ and a friction $F_t$ exerted on the wheels have to be considered. As a result, as represented by Equation 1 below, there is a problem of inviting an increase of variables of a motion sub-space $S_0$ of the base unit. However, six elements in each column of the motion sub-space $S_0$ generally represent, from a 0-th element, a degree of freedom of rotation around the X axis (roll), a degree of freedom of rotation around the Y axis (pitch), a degree of freedom of rotation around the Z axis (yaw), a degree of freedom of translation in the X axis, a degree of freedom of translation in the Y axis direction, and a degree of freedom of translation in the Z direction.

$$S_0 = \begin{pmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix} \quad (1)$$

Figure 5:
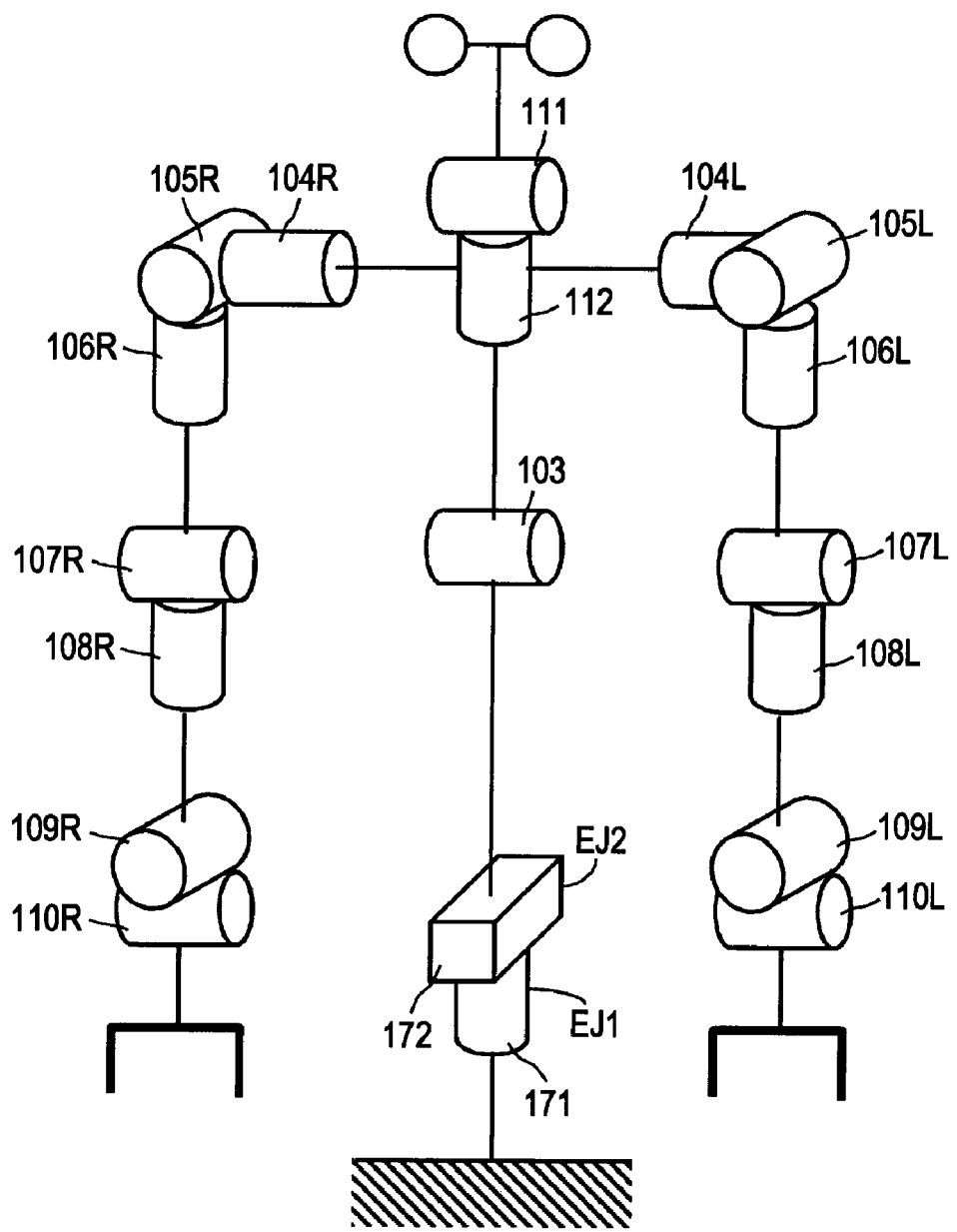
FIG. 5 illustrates a low-dimensionally modeled structure of degrees of freedom at joints, which is equivalent to the wheel mechanism of the mobile robot depicted in FIGS. 1A to 1C.
Figure 6:
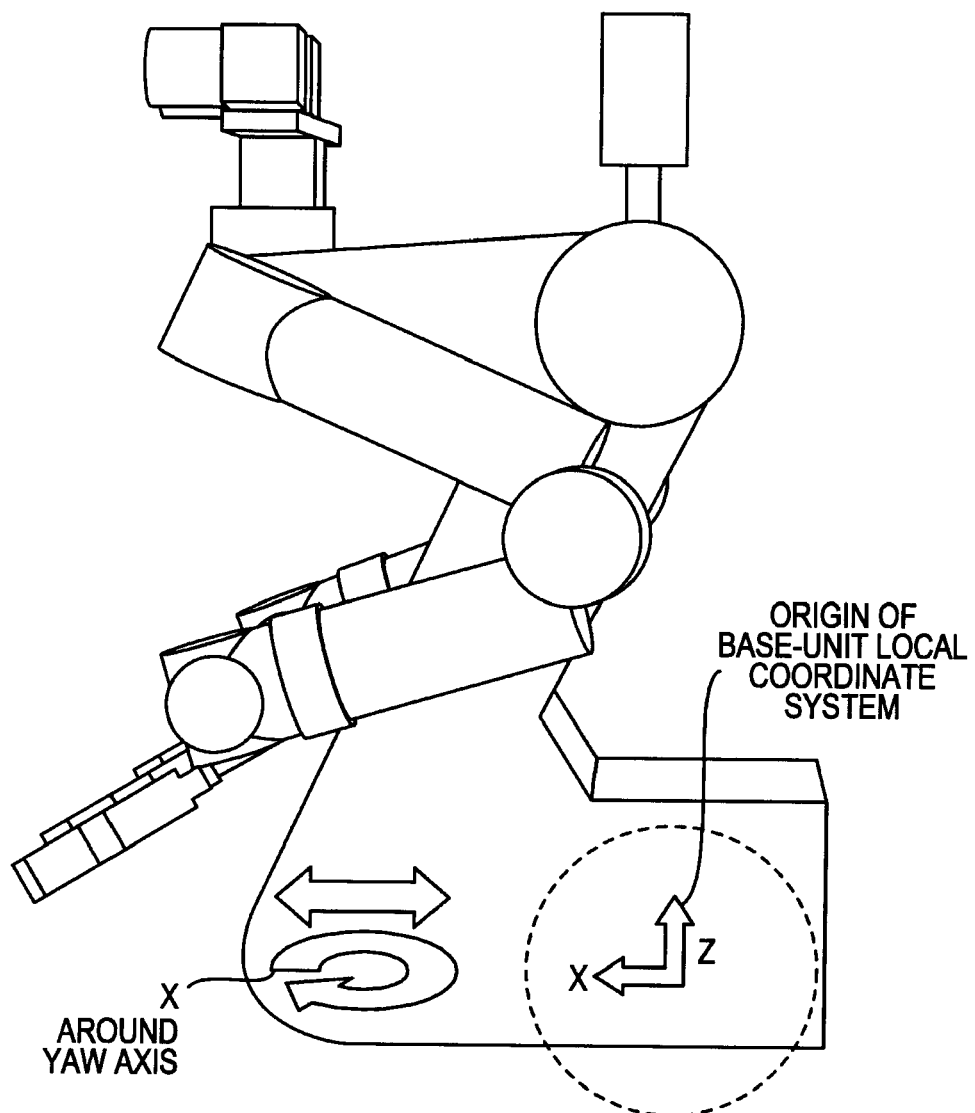
FIG. 6 illustrates degrees of freedom of a base unit when the wheel mechanism is low-dimensionally modeled so as to be an equivalent one.

Thus, in the present embodiment, as depicted in FIG. 5, in place of the wheels, consider low-dimensionally-modeled wheel-equivalent joints as a kinematics model equivalent to an opposed two-wheel one, the joints having two degrees of freedom, that is, a degree of freedom in a rotating direction (around the yaw axis: EJ1) viewed from a base-unit local coordinate system indicated by a reference numeral 171 and a translational degree of freedom in a forward direction indicated by a reference numeral 172 (X: EJ2). FIG. 6 depicts degrees of freedom of the base unit achieved by the wheel equivalent joints when low-dimensionalized as depicted in FIG. 5. This low-dimensional model corresponds to defining wheel-equivalent joints having the motion sub-space $S_0$ with two degrees of freedom as represented by Equation 2 below.

$$S_0 = \begin{pmatrix} 0 & 0 \\ 0 & 0 \\ 1 & 0 \\ 0 & 1 \\ 0 & 0 \\ 0 & 0 \end{pmatrix} \quad (2)$$

Here, the first column of the motion sub-space $S_0$ represented by Equation 2 above represents a degree of freedom of rotation in the Z axis (yaw) (EJ1) viewed from a coordinate system fixed to the base unit, and the second column thereof represents a degree of freedom of translation in the X axis (EJ2) viewed therefrom.

By defining the motion sub-space $S_0$ represented by Equation 2 above, as depicted in FIG. 6, the base unit of the mobile robot becomes a system capable of only a rotation around a vertical axis and a translational motion in a back-and-forth direction when viewed from the local coordinate system fixed to the base unit. Therefore, the constraints of the opposed two wheels incapable of a translational motion in the horizontal direction can be handled in a low dimensional manner, that is, in a smart manner. Also, according to the equivalent model depicted in FIGS. 5 and 6, the entire mobile robot is equivalent to a branched single manipulator together with the upper limb, thereby allowing easy handling of control of a whole-body cooperation type.

In the present embodiment, the mobile robot of an opposed two-wheel type depicted in FIGS. 2 to 4 is regarded as an equivalent robot as depicted in FIGS. 5 and 6 for a whole-body cooperative-force control. Also, a transforming unit is separately provided for transforming observation amounts and control amounts of the degree of freedom of the yaw axis (EJ1) and the degree of freedom of translation in the X axis (EJ2) of the base unit and the degrees of freedom of rotation of the right and left wheels. With this, a whole-body cooperative-force control as a mobile robot of an opposed two-wheel type is performed.

Figure 7:
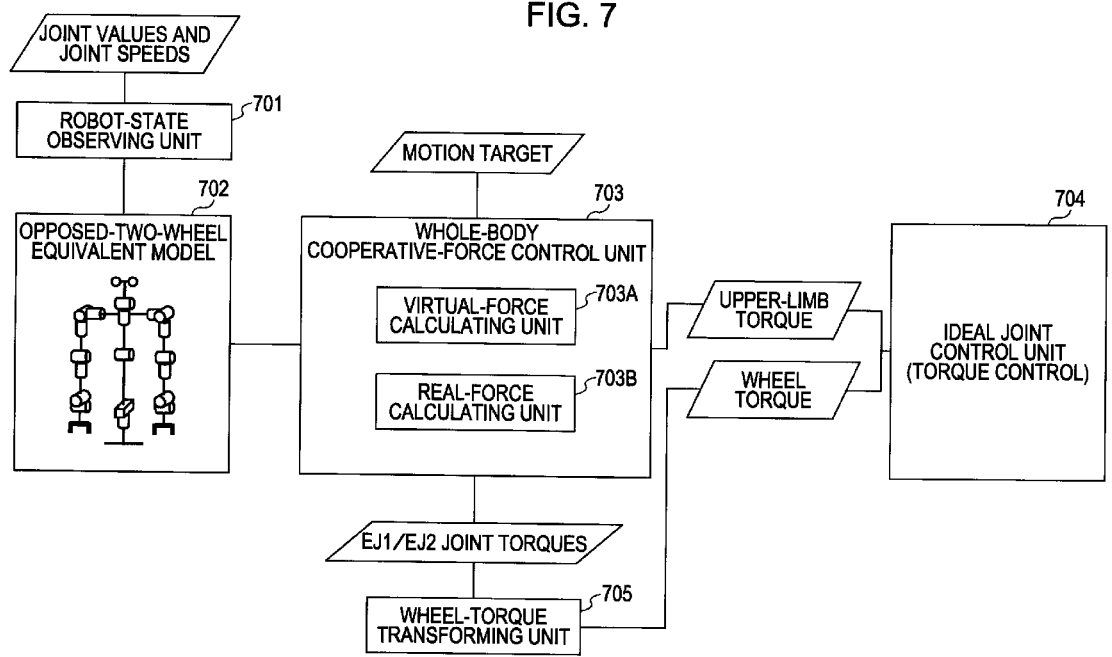
FIG. 7 schematically illustrates the entire structure of a control system of the mobile robot.

FIG. 7 schematically depicts the entire structure of a control system of the mobile robot. The depicted control system includes a robot-state observing unit 701, an opposed-two-wheel equivalent model 702, a whole-body cooperative-force control unit 703, an ideal joint control unit 704, and a wheel-torque transforming unit 705. In the following, the process of each functional block is described in detail.

The opposed-two-wheel equivalent model 702 is an equivalent robot (mentioned above) as depicted in FIGS. 5 and 6 obtained by low-dimentionalizing the constraints of the actual mobile robot of an opposed two-wheel type depicted in FIGS. 2 to 4.

The robot-state observing unit 701 is configured of an encoder and a microcomputer equipped in the actuator on each axis. In a pre-stage of whole-body cooperative-force control, the robot-state observing unit 701 reflects an actual state of the mobile robot onto the robot model having an opposed-two-wheel equivalent base, according to the observed data, depicted in FIGS. 5 and 6. Basically, a joint value from the encoder and a joint speed obtained by differentiating the joint value are set as a joint value and joint speed of the opposed-two-wheel equivalent model. That is, when an output $q_i$ from an encoder equipped in an i-th joint actuator is taken as a joint value, the robot-state observing unit 701 observes the state for each joint i other than the opposed-two-wheel equivalent base as represented by Equations 3 and 4 below.

$q_i$=joint angle obtained from an encoder value (3)

$\dot{q}_i$=joint angular velocity obtained from a numerical differential value of the encoder value (4)

Figure 8:
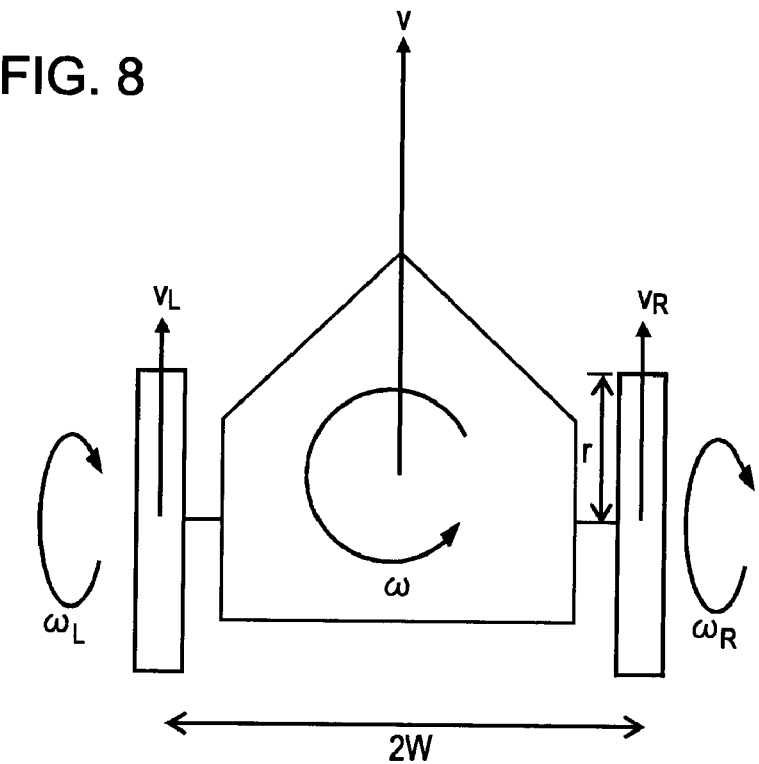
FIG. 8 illustrates the procedure of calculating a forward speed and swing speed of the base unit equivalent to that of an opposed-two-wheel mobile robot from rotation speeds of left and right wheels.

Also, the robot-state observing unit 701 obtains the position and joint speed of the yaw axis and X axis of the base unit equivalent to the opposed two wheels by performing a transformation from observation amounts of the degrees of freedom of the rotation of the left and right wheels, that is, output values from the encoders of both wheels. As depicted in FIG. 8, when r is a wheel radius, 2W is a wheel-to-wheel distance, and $\omega_L$ and $\omega_R$ are rotation speeds of the wheels obtained by numerically differentiating encoder values of the left and right wheels, speeds $v_L$ and $v_R$ of the left and right wheels at a ground point are as represented by Equations 5 and 6 below, respectively.

$$v_L = r\omega_L \quad (5)$$

$$v_R = r\omega_R \quad (6)$$

When v is a forward speed of the base unit and $\omega$ is a rotation speed, these are represented by Equations 7 and 8 below by using the speeds $v_L$ and $v_R$ of the left and right wheels at the contact point, respectively. The robot-state observing unit 701 sets these as joint speeds of the degree of freedom of translation in the forward direction EJ2 and the degree of freedom of rotation in the rotating direction EJ1 of the wheel equivalent joints.

$$v = (v_L + v_R)/2 \quad (7)$$

$$\omega = (v_R - v_L)/2W \quad (8)$$

When $x_0$ is a position in a world coordinate system of the base unit and $\theta$ is a posture (azimuth angle), their speeds are represented by Equations 9 and 10 below, respectively.

$$\dot{x}_0 = \begin{pmatrix} v\cos\theta \\ v\sin\theta \\ 0 \end{pmatrix} \quad (9)$$

$$\dot{\theta} = \omega \quad (10)$$

When these speeds are numerically differentiated as shown in Equations 11 and 12 below, a position and posture $(x_{0j}, \theta_j)$ of the base unit at a sampling time j can be obtained.

$$x_{0_i} = x_{0_{i-1}} + \Delta t \dot{x}_0 \qquad (11)$$

$$\theta_i = \theta_{i-1} + \Delta t \dot{\theta} \qquad (12)$$

In the equations above, $\Delta t$ is a sampling period (for example, a period of one millisecond). This is a technique called dead reckoning (or odometry), obtaining a position and posture of the base station. Another technique, such as simultaneous localization and mapping (SLAM), may be used to estimate a self position to update the position and posture of the base unit.

In the whole-body cooperative-force control unit 703, for force control over the whole-body cooperative motion of the robot, a virtual-force calculating unit 703A performs a first process of finding a virtual force $f_v$ to accomplish a motion target (task), and a real-force calculating unit 703B performs a second process of transforming this virtual force $f_v$ to a real force. The real force calculated by the real-force calculating unit 703B includes a torque of each joint actuator of the robot formed of the opposed-two-wheel equivalent model and an external force exerted on the robot.

According to the opposed-two-wheel equivalent model depicted in FIGS. 5 and 6, the entire robot is formed of a single branched manipulator structure. An equation of motion of the entire robot is assumed to be represented by Equation 13 below.

$$\tau = H\ddot{q} + b \qquad (13)$$

In Equation 13 above, q is a joint space formed of a vector obtained by concatenating all joint values in a link structure where rigid-body links are concatenated via joints, and is also called generalized variables. Also, H is an inertia matrix with respect to the joint space, $\tau$ is a joint force (generalized force) corresponding to the joint space q, and b is gravity or Coriolis force.

Here, a concept called "Operational Space" is an important concept in robot control of a force control system. The operational space is a space for describing a relation between a force acting on a robot and an acceleration generated. The operational space is typically used when a way of communication between the robot and the environment is used as a constraint condition in the case where the joint angle of the robot is used not for position control but for force control.

A task is assumed to be defined with respect to an operational space x. The operational space x can be associated to a relation with a time differentiation value of the joint space q by using Jacobian J in a form represented by Equation 14 below.

$$\dot{x} = J\dot{q} \qquad (14)$$

Equation 14 above is transformed to Equation 15 below.

A motion request, that is, task, regarding the position, speed, and acceleration of the opposed-two-wheel equivalent model is given as an acceleration of the operational space x. The virtual force $f_v$ to be applied to the operational space x to accomplish the task is formulated as a type of linear complementarity problem as represented by Equation 15 below. In other word, the first process performed by the virtual-force calculating unit 703A is to solve a liner complementarity problem represented by Equation 15 below to obtain the virtual force $f_v$ acting on the operational space x.

$$w + \ddot{x} = \Lambda^{-1} f_v + c \qquad (15)$$

$$\text{s.t.} \begin{cases} ((w_i < 0) \wedge (f_{v_i} = U_i)) \vee \\ ((w_i > 0) \wedge (f_{v_i} = L_i)) \vee \\ ((w_i = 0) \wedge (L_i < f_{v_i} < U_i)) \end{cases}$$

In Equation 15 above, $L_i$ and $U_i$ are assumed to be a negative lower-limit value and a positive upper-limit value (including $\pm\infty$), respectively, of an i-th element of the virtual force $f_v$. Also, $\Lambda^{-1}$ is called an operational-space inertia inverse matrix, and is represented by Equation 16 below.

$$\Lambda^{-1} = JH^{-1}J^T \qquad (16)$$

In Equation 15 above, c corresponds to an operational-space bias acceleration (that is, acceleration acting on the operational space when no external force acts), and is represented by Equation 17 below.

$$c = JH^{-1}(\tau - b) + \dot{J}\dot{q} \qquad (17)$$

For details about a method of solving the virtual force $f_v$ to accomplish a task as a liner complementarity problem, refer to Japanese Patent Application Publication No. 2007-272099, which has already been assigned to Sony Corporation.

To solve the liner complementarity problem above, the operational-space inertia inverse matrix $\Lambda^{-1}$ and the operational-space bias acceleration c are typically calculated. Here, a forward dynamics arithmetic operation FWD with respect to the operational space x is represented by Equation 18 below.

$$\ddot{x} = FWD(q, \dot{q}, \tau, g, f_v) \qquad (18)$$

According to the forward dynamics arithmetic operation FWD represented in Equation 18 above, from the joint space q corresponding to the opposed-two-wheel model formed of the link structure and force information acting on the link structure, such as the joint force $\tau$, the gravity g, and the virtual force $f_v$, an acceleration occurring at each point of the link structure can be obtained. Here, in Equation 18 above, under a constraint condition in which all input parameters in the forward dynamics arithmetic operation FWD other than the joint space q and the virtual force $f_v$ are taken as 0, an acceleration occurring in the operational space can be found under the circumstances where no gravity, joint force, and force relating to a velocity product (such as Coriolis force) occurs. That is, it can be assumed in Equation 17 that the bias acceleration c=0. Furthermore, $f_v = e_i$, that is, when calculation is performed under the condition where a unit virtual force is acted only on an i-th operational space, an i-th column of the operational-space inertia inverse matrix $\Lambda^{-1}$ can be found. Thus, when the arithmetic operation in Equation 19 below is performed for every column i, the entire operational-space inertia inverse matrix $\Lambda^{-1}$ can be obtained.

$$i\text{-th column of } \Lambda^{-1} = FWD(q, 0, 0, 0, e_i) \qquad (19)$$

Also, by performing the forward dynamics arithmetic operation FWD of Equation 18 above with the external force f=0 and under a constraint condition where only the force occurring at a joint, the joint speed, and the gravity act, the operational-space bias acceleration c can be extracted as represented by Equation 20 below.

$$c = FWD(q, \dot{q}, \tau, g, 0) \qquad (20)$$

In short, by combining Equations 19 and 20 above to perform a forward dynamics arithmetic operation FWD by using the generalized variable q as a dynamical model for a link structure, the operational-space inertia inverse matrix $\Lambda^{-1}$ and the operational-space bias acceleration c, which are important physical amounts in the operational space, can be found.

Initially, the forward dynamics arithmetic operation FWD is generally formulated by using an inverse dynamics arithmetic operation (arithmetic operation of finding a force from an acceleration). However, this arithmetic operation has a calculation amount of $O(N^3)$, and as the number of degrees of freedom increases, the operation amount disadvantageously increases. Currently, with the advance of studies thereafter, a single CPU is used to accomplish a calculation amount of O(N) and a plurality of CPUs are made in parallel to accomplish a calculation amount of O (log(N)). In an example of using a single CPU (O (N)), a method of formulating FWD in a forward dynamics arithmetic operation using the articulated body (AB) algorithm is used. For details about the AB algorithm, refer to R. Featherstone, "Robot Dynamics Algorithms" (Kluwer Academic Publishers, 1987), for example.

The AB algorithm is formulated by a recursive arithmetic operation for each link. In the present embodiment, the AB algorithm is divided into four processes, that is, calculation of inertia information, calculation of speed information, calculation of force information, and calculation of acceleration information, and the base unit of the opposed-two-wheel equivalent model is represented as follows.

Calculation of Inertia Information:

$I_0^A$ of the base link (articulated body inertia) is found by executing Equation 21 below.

$$I_0^A = I_0 + \sum_{j \in C_0} {}_0X_j \{I_j^A - I_j^A S_j (S_j^T I_j^A S_j)^{-1} S_j^T I_j^A\}_j X_0 \quad (21)$$

It is assumed herein that $I_0$ is an inertia of a base link, $C_0$ is an index set of child links of the base link, and ${}_iX_j$ is a transformation from a coordinate system i to a coordinate system j.

Calculation of Speed Information:

When $v_0$ is a speed of the base link and $q_0$ is a joint value of the base link, speed information is found by performing Equation 22 below. $S_0$ is a matrix (motion sub-space) representing a degree of freedom of motion of the joint of the base link.

$$v_0 = S_0 \dot{q}_0 \quad (22)$$

Calculation of Force Information:

As force information, a bias force $p_0$ of the base link is found by executing Equation 23 below.

$$p_0 = v_0 \times I_0 v_0 - \sum_{k \in F_0} f_k + \sum_{j \in C_0} {}_0X_j \left\{ \begin{array}{c} p_j + I_j^A S_j (S_j^T I_j^A S_j)^{-1} \\ (\tau_j - S_j^T p_j) \end{array} \right\} \quad (23)$$

Here, $f_k$ is a k-th external force to the base link, $F_0$ is an index set of external forces acting on the base link, and $\tau_j$ is a joint force of a link j.

Calculation of Acceleration Information:

For acceleration information, an acceleration $a_0$ of the base link is found by executing Equations 24 and 25 below.

$$\ddot{q}_0 = (S_0^T I_0^A S_0)^{-1} \{\tau_0 - S_0^T (I_0^A X_0^A g + p_0)\} \quad (24)$$

$$a_0 = X_0^T g + S_0 \ddot{q}_0 \quad (25)$$

It is assumed herein that $X_0$ is a posture of the base link and g is an acceleration of gravity.

Here, for details about a high-speed method of calculating an operation-space inertia inverse matrix $\Lambda^{-1}$ and an operation-space bias acceleration c, refer to Japanese Unexamined Patent Application Publication No. 2007-108955, which has already been assigned to Sony Corporation.

Next, in the second process performed by the real-force calculating unit 703B of transforming the virtual force $f_v$ to a real force, the virtual force $f_v$ is transformed to an external force $f_e$, such as a floor reaction force, and a generation force $\tau_a$ of the actuator so that Equation 26 below holds.

$$\begin{bmatrix} J_{vu}^T \\ J_{va}^T \end{bmatrix} (f_v - \Delta f_v) = \begin{bmatrix} J_{eu}^T \\ J_{ea}^T \end{bmatrix} f_e + \begin{bmatrix} 0 \\ \tau_a \end{bmatrix} \quad (26)$$

In Equation 26 above, $J_{vu}$ and $J_{va}$ are a minor driving joint element and a driving joint element of Jacobian, respectively, regarding the operational space on which the virtual force $f_v$ acts. $J_{eu}$ and $J_{ea}$ are a minor driving joint element and a driving joint element of Jacobian, respectively, regarding the operational space on which the external force $f_e$ acts. $\Delta f_v$ represents an element of the virtual force not achievable with the real force. Equation 26 above is indeterminate. In general, by solving a quadratic-programming problem (QP), the external force $f_e$ and the generation force $\tau_a$ of the actuator can be obtained. For details, refer to Japanese Patent Application Publication No. 2007-272099 (mentioned above).

As can be seen from FIGS. 5 and 6, the robot having the opposed-two-wheel equivalent base according to the present embodiment has no minor driving joint, and no external force acting on the wheels is taken as a variable (by contrast, as depicted in FIG. 2, an actual robot has minor driving joints 151 to 153, and external forces $F_n$ and $F_t$ act on the wheels as depicted in FIG. 4). Therefore, in the second process by the real-force calculating unit 703B of transforming the virtual force $f_v$ to a real force, 0 is substituted into $f_e$ and $\Delta f_v$ in Equation 26 above for simplification as represented by Equation 27 below.

$$\tau_a = J_{va}^T f_v \quad (27)$$

In this manner, the whole-body cooperative-force control unit 703 calculates a request torque for every joint, including the joints EJ1 and EJ2 of the opposed-two-wheel equivalent base. Then, the wheel-torque transforming unit 705 transforms the request torques for the joints EJ1 and EJ2 of the opposed-two-wheel equivalent base to request torques for the left and right driving wheels 101L and 101R, respectively.

Figure 9:
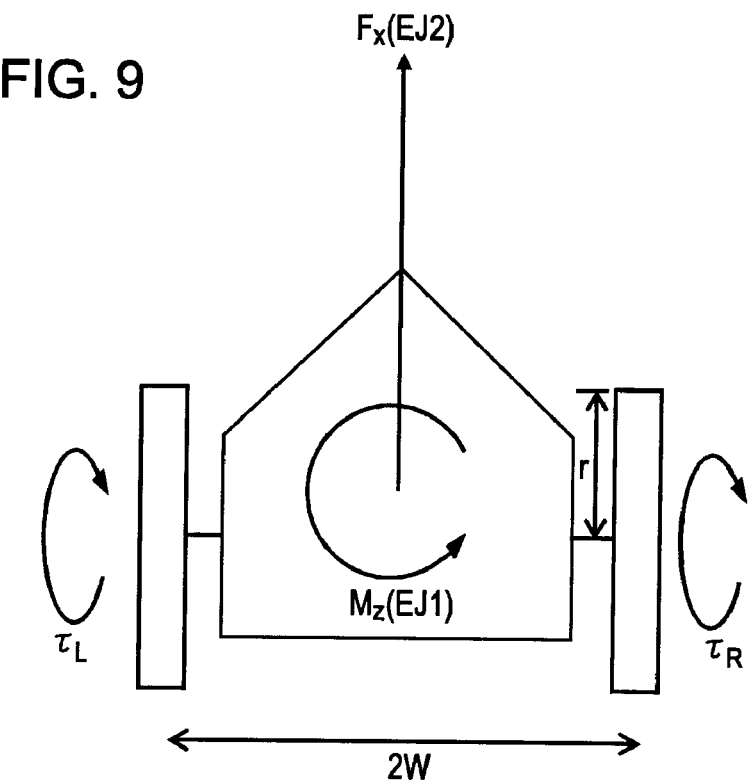
FIG. 9 illustrates the procedure of transforming a request torque to a joint with a rotational degree of freedom in a swing (yaw) direction and a joint with a translational degree of freedom in a forward direction to request torques to left and right wheels.

As depicted in FIG. 9, when $M_z$ is a joint force of the yaw-direction joint EJ1, $F_x$ is a joint force of the X-direction joint EJ2, $\tau_L$ is a torque for the left wheel, $\tau_R$ is a torque for the right wheel, r is a wheel radius, and 2W is a wheel-to-wheel distance, a relation represented by Equation 28 below holds among these values.

$$\begin{pmatrix} F_x \\ M_z \end{pmatrix} = \begin{pmatrix} 1/r & 1/r \\ -W/r & W/r \end{pmatrix} \begin{pmatrix} \tau_L \\ \tau_R \end{pmatrix} \quad (28)$$

When Equation 28 above is solved for $\tau_L$ and $\tau_R$, Equation 29 below holds. These can be taken as request torques for left and right wheels 101L and 101R.

$$\begin{pmatrix} \tau_L \\ \tau_R \end{pmatrix} = \frac{r^2}{2W} \begin{pmatrix} W/r & -1/r \\ W/r & 1/r \end{pmatrix} \begin{pmatrix} F_x \\ M_z \end{pmatrix} \quad (29)$$

In this manner, since request torque for all joints of the upper limb and the wheels are obtained, the ideal joint control unit 704 performs a torque control so that the request torque values, joint inertia assumed in the opposed-two-wheel equivalent model, and viscous drag are achieved for all joints, thereby controlling forces in a whole-body cooperation type including the wheels.

The joint part of the robot has unknown physical parameters difficult to model or identify, such as friction and inertia. Due to these unknown parameters, it may be difficult to generate a predetermined torque. Also, the generated torque may not produce a theoretically-expected response, thereby preventing a sufficient force control. To solve these problems, a virtualization actuator for making an ideal response to an instruction for a generated torque and to an external torque can be applied, which is disclosed in, for example, Japanese Patent Application Publication No. 2008-119508, which has already been assigned to Sony Corporation (mentioned above).

Figure 10:
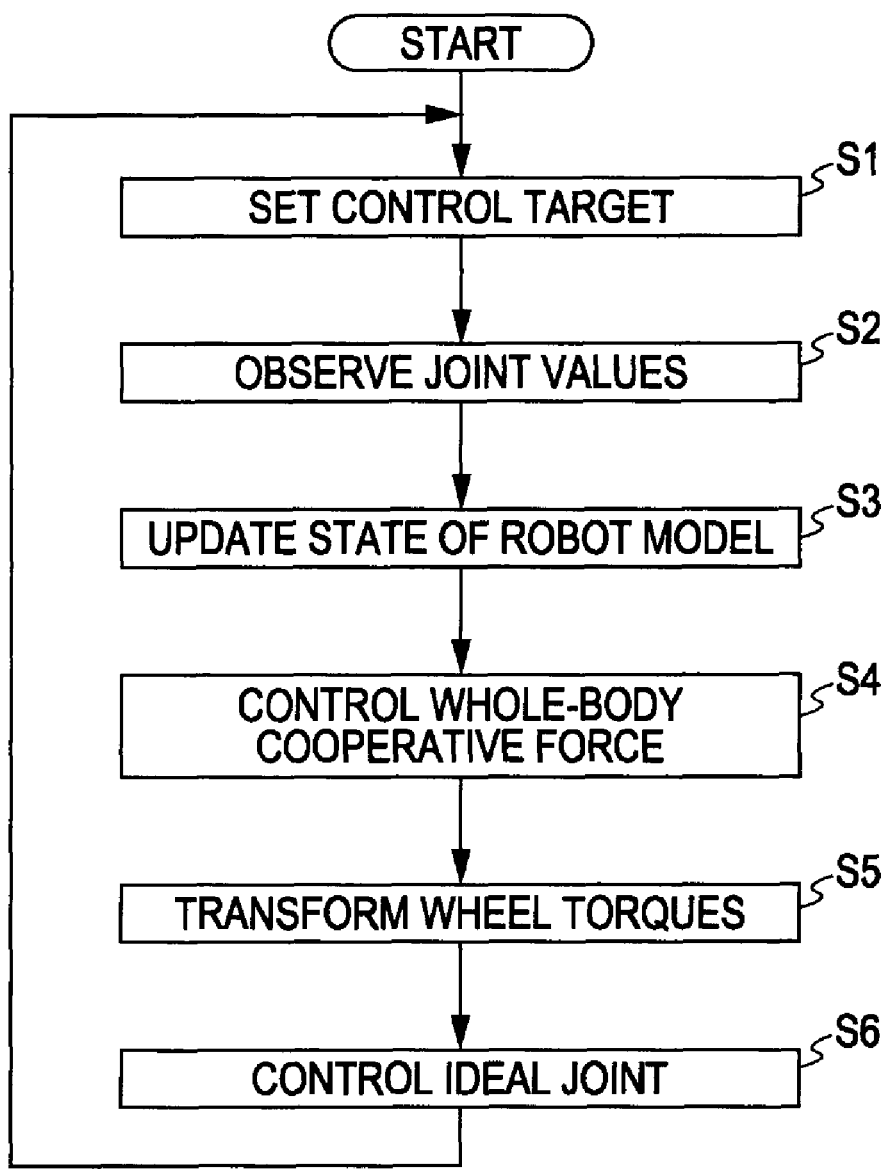
FIG. 10 is a flowchart of the procedure of a process in a control system of the mobile robot depicted in FIG. 7.
Figure 11A:
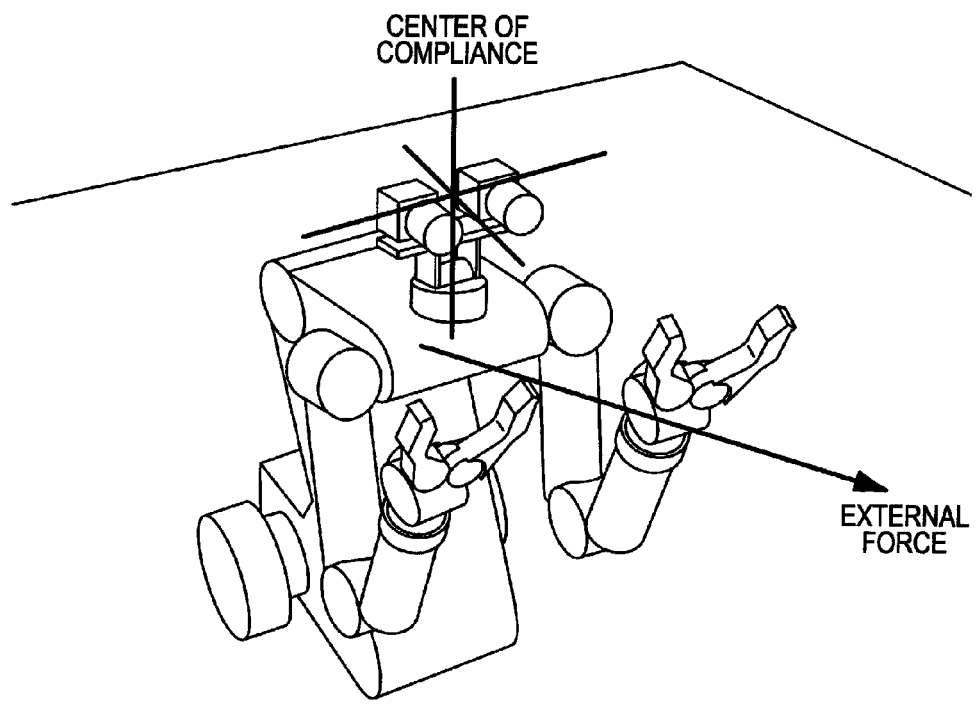
FIG. 11A illustrates an example of a sequence (dynamical simulation) when impedance control is performed on the position and posture of a head portion to control cooperative forces of a whole body including the wheels.
Figure 11B:
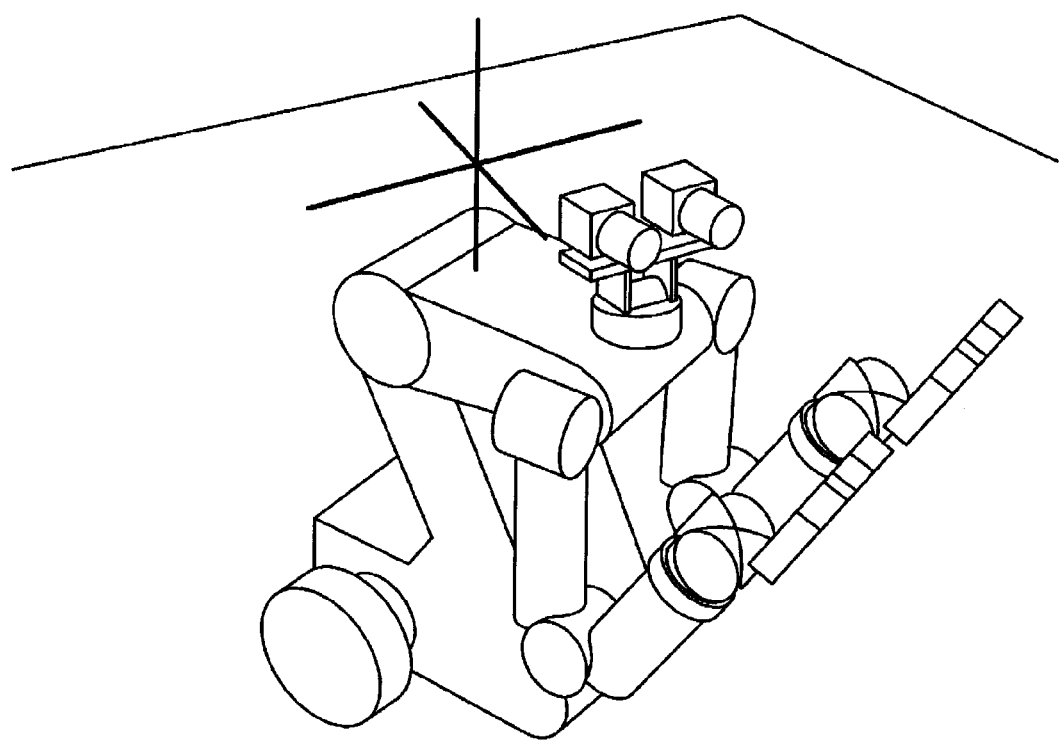
FIG. 11B illustrates the example of the sequence (dynamical simulation) when impedance control is performed on the position and posture of the head portion to control cooperative forces of the whole body including the wheels.
Figure 11C:
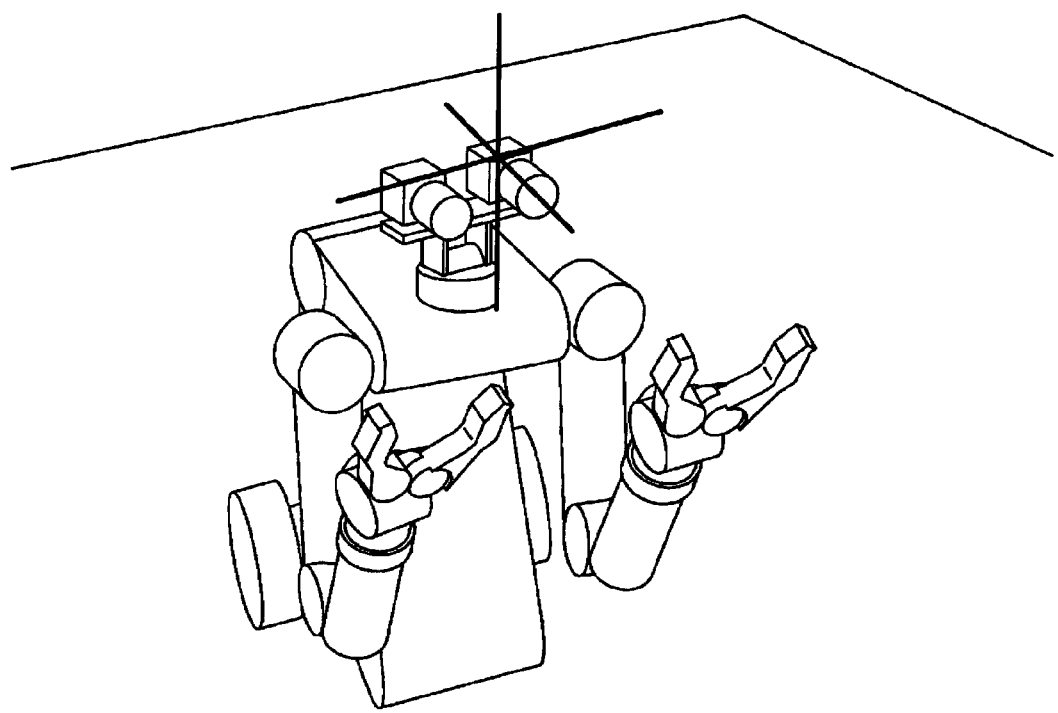
FIG. 11C illustrates the example of the sequence (dynamical simulation) when impedance control is performed on the position and posture of the head portion to control cooperative forces of the whole body including the wheels.
Figure 11D:
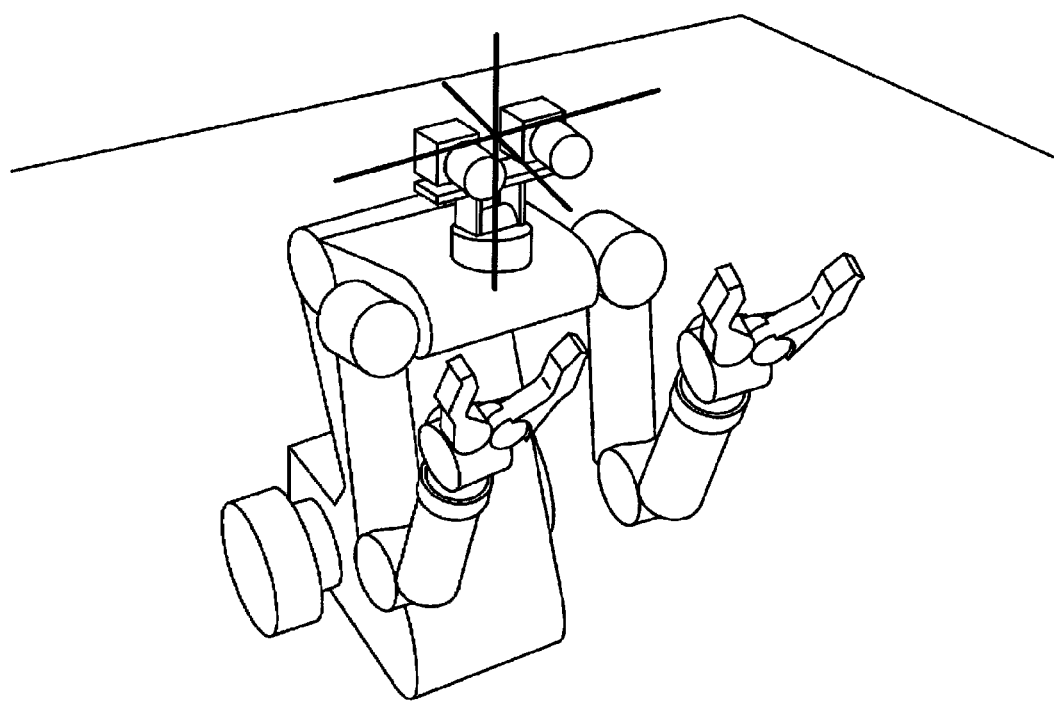
FIG. 11D illustrates the example of the sequence (dynamical simulation) when impedance control is performed on the position and posture of the head portion to control cooperative forces of the whole body including the wheels.
Figure 12:
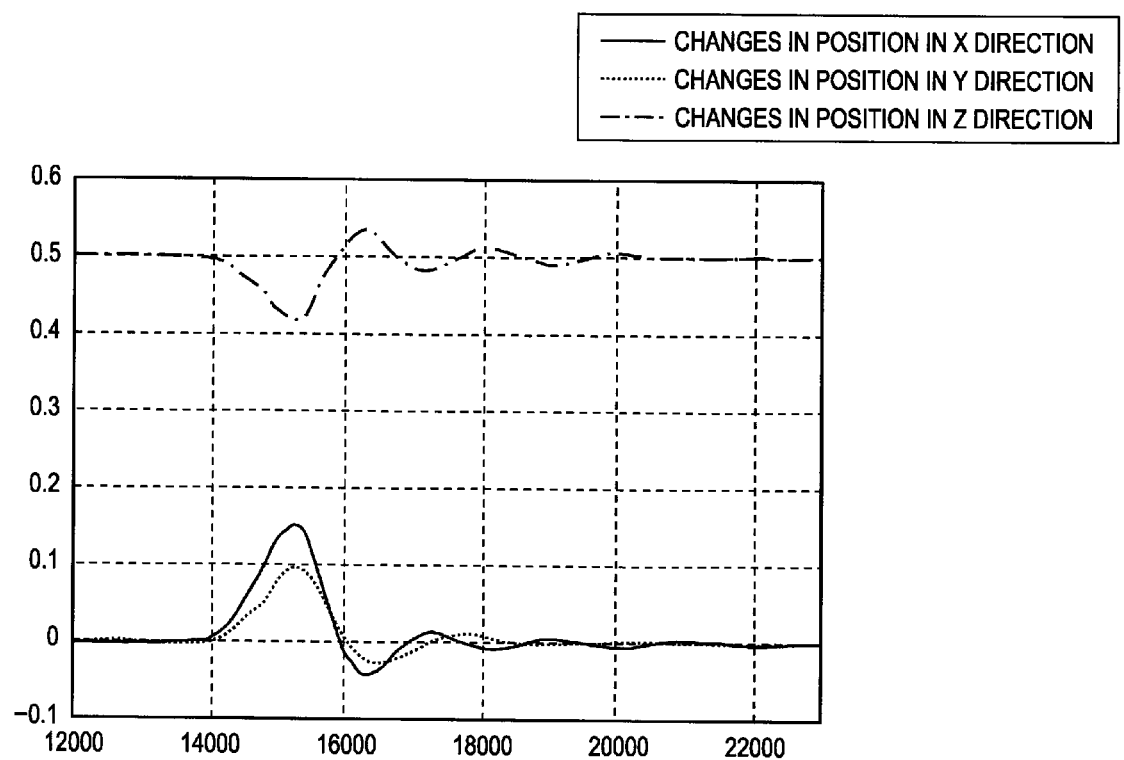
FIG. 12 illustrates changes in position of a neck in the example of the sequence depicted in FIGS. 11A to 11D.
Figure 13:
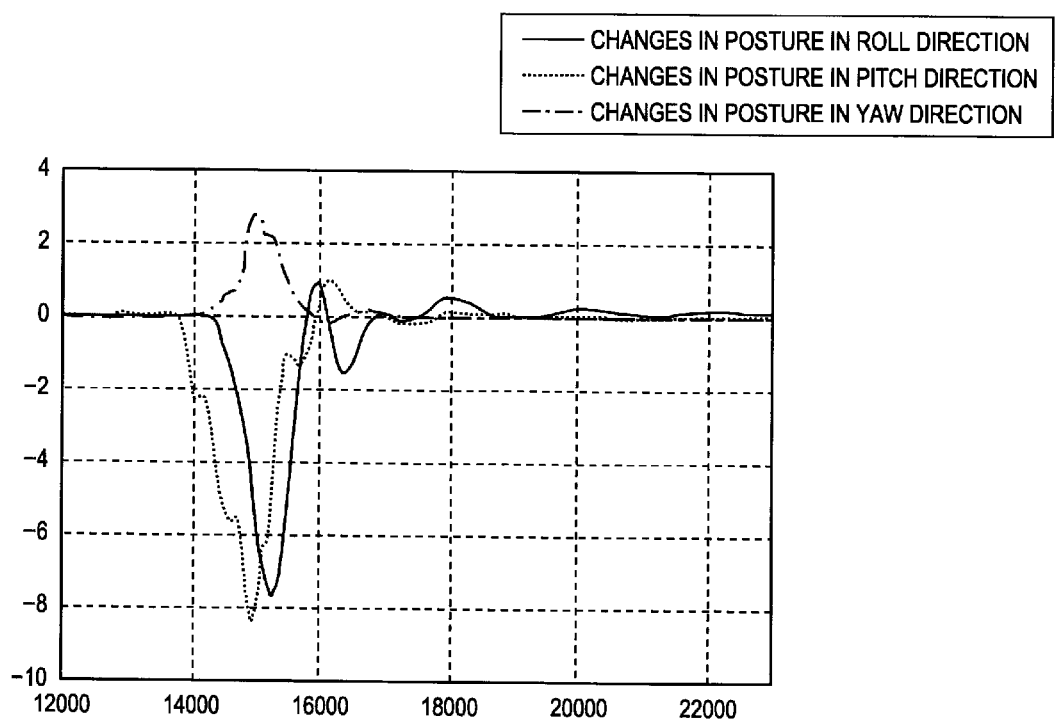
FIG. 13 illustrates changes in posture of a neck in the example of the sequence depicted in FIGS. 11A to 11D.
Figure 14:
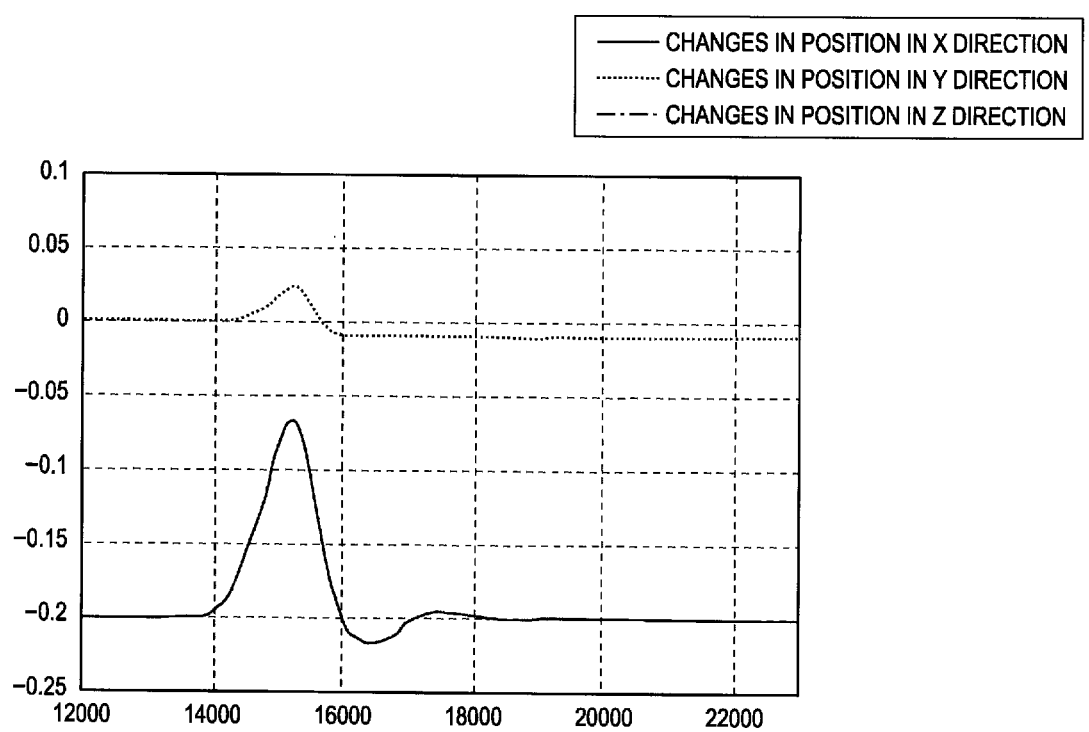
FIG. 14 illustrates changes in position of the base unit in the example of the sequence depicted in FIGS. 11A to 11D.
Figure 15:
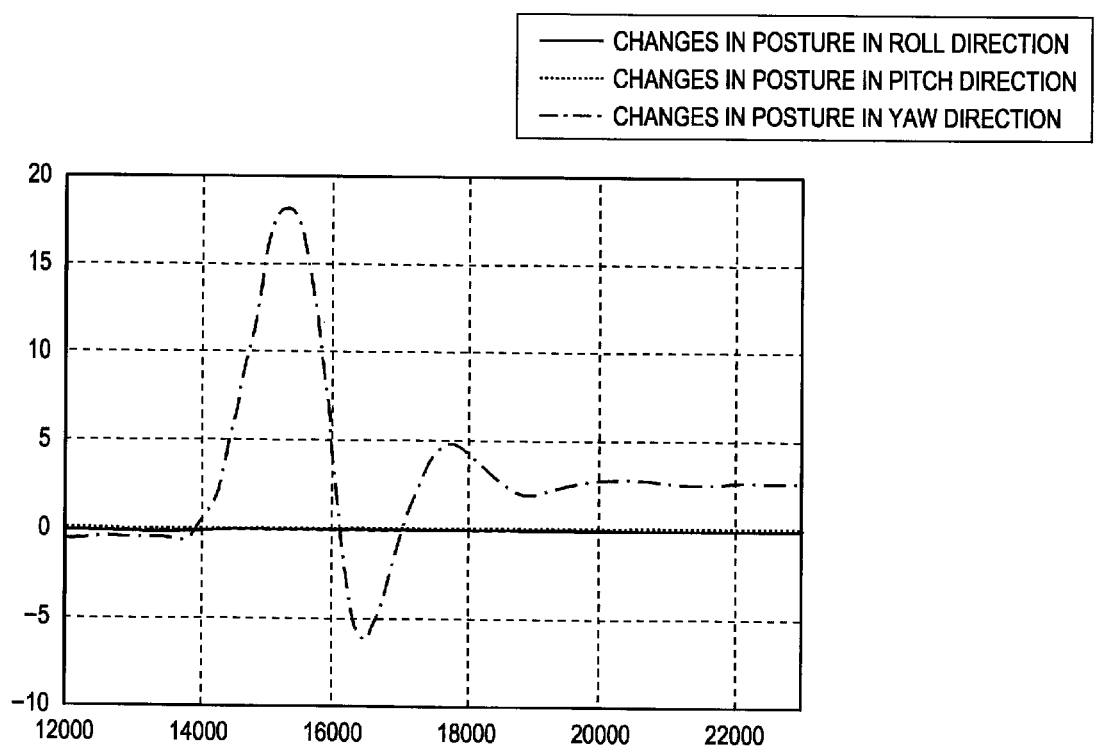
FIG. 15 illustrates changes in posture of the base unit in the example of the sequence depicted in FIGS. 11A to 11D.

FIG. 10 is a flowchart of the procedure in a control system of the mobile robot depicted in FIG. 7.

First, a motion target is set at the whole-body cooperative-force control unit 703 (step S1).

Next, the robot-state observing unit 701 reads output values from encoders provided to all joint-driving actuators to measure joint values and joint speeds (step S2).

Next, the robot-state observing unit 701 calculates joint values and joint speeds of the wheel equivalent joints EJ1 and EJ2 based on encoder values of the left and right wheel-driving actuators 102L and 102R to set all joint values and joint speeds in the opposed-two-wheel equivalent model (step S3).

Next, in the whole-body cooperative-force control unit 703, for force control over the whole-body cooperative motion of the robot, the virtual-force calculating unit 703A performs a first process of finding a virtual force $f_v$ to accomplish a motion target (task), and the real-force calculating unit 703B performs a second process of transforming this virtual force $f_v$ to a real force, thereby calculating an external force in the opposed-two-wheel equivalent model and request torques for all joints (step S4).

Next, the wheel-torque transforming unit 705 transforms the request torques for the joints EJ1 and EJ2 on an opposed-two-wheel equivalent base to request torques for the left and right driving wheels 101L and 101R (step S5).

In this manner, after the request torques for all joints of the upper limb and the wheels are obtained, the ideal joint control unit 704 performs a torque control so that the request torque values, the joint inertia assumed in the opposed-two-wheel equivalent model, and viscous drag are achieved for all joints (step S6). To the ideal joint control unit 704, for example, a virtualization actuator as disclosed in Japanese Patent Application Publication No. 2008-119508 is applied.

The control system for the mobile robot performs the processes at steps S1 to S6 above at predetermined control intervals, for example, one millisecond.

Finally, exemplary application of an embodiment of the present invention to a mobile robot of an opposed-two-wheel type is described.

FIGS. 11A to 11D depict a sequential example (dynamics simulation) when an impedance control is performed over the position and posture of the head portion for a cooperative-force control over the entire body including the wheels. Each drawing depicts a state in which the wheels and the upper limb are cooperated with each other when disturbance is initially provided and the body is returned to specified position and posture with predetermined compliance.

FIGS. 12 to 15 depict changes in position and posture of the neck and the base unit at that time.

From each drawing, it can be found that even a robot with opposed two wheels can perform a force interaction of a whole-body cooperation type with the wheels and the upper limb in cooperation with each other. Even an inexpensive robot with two wheels can accomplish various tasks to flexibly support the human and environment.

The present application contains subject matter related to that disclosed in Japanese Priority Patent Application JP 2009-035168 filed in the Japan Patent Office on Feb. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A robot apparatus having a base unit, a wheel unit of an opposed-two-wheel type mounted on the base unit and having driving wheels drivable so as to face each other, and an upper-body unit provided on an upper portion of the base unit and configured by concatenating one or more joints, the robot apparatus comprising:
    an opposed-two-wheel equivalent model obtained by replacement with a wheel equivalent joint representing a degree of freedom of the wheel unit with a degree of freedom of rotation and a degree of freedom of translation of the base unit and by modeling the robot apparatus as a whole as a single manipulator structure;
    a robot-state observing unit observing a current state of the robot apparatus formed of an angle and an angular velocity of each of the joints of the upper-body unit and an angle and an angular velocity of the wheel unit and reflecting the current state of the robot apparatus onto the opposed-two-wheel equivalent model;
    a control unit performing a control arithmetic operation for the opposed-two-wheel equivalent model;
    a transforming unit transforming a part of control target values calculated by the control unit to a control target value for the wheel unit; and
    a joint control unit controlling a joint-driving actuator of the wheel unit based on the control target value of the wheel unit obtained through the transformation by the transforming unit and also controlling a joint-driving actuator other than the joint-driving actuator of the wheel unit based on a control target value calculated by the control unit.

2. The robot apparatus according to claim 1, wherein
    the wheel equivalent joint has a degree of freedom of rotation in a rotating direction and a degree of freedom of translation in a back-and-forth direction of the base unit, and
    the robot-state observing unit calculates a position and a posture of the base unit from the observed angle and the angular velocity of the wheel unit.

3. The robot apparatus according to claim 1, wherein
    the control unit calculates a target joint force for each of the joints of the opposed-two-wheel equivalent model of the robot apparatus, and
    the transforming unit transforms a target joint force for the wheel equivalent joint to a target joint force for the wheel unit.

4. The robot apparatus according to claim 3, wherein
    the control unit calculates a virtual force acting on the opposed-two-wheel equivalent model to obtain a motion target of the robot apparatus, and transforms the virtual force to a target joint force equivalent to the virtual force.

5. The robot apparatus according to claim 1, further comprising
operating-force detecting means for detecting an acting force in a joint driving direction in at least a part of the joints, and
the joint control unit performs a force control over the joints.

6. The robot apparatus according to claim 5, wherein
when a target joint force, an acting force in a joint driving direction, and a joint driving speed are given, the joint control unit determines an instruction joint force to the joint-driving actuator based on an ideal response model of the joint-driving actuator defining a relation of a joint acceleration target value obtained by the joint-driving actuator ideally making a response, and performs a force control over the joints.

7. A method of controlling a robot apparatus having a base unit, a wheel unit of an opposed-two-wheel type mounted on the base unit and having driving wheels drivable so as to face each other, and an upper-body unit provided on an upper portion of the base unit and configured by concatenating one or more joints, the method comprising the steps of:

setting a motion target of the robot apparatus;
obtaining a joint value and a joint speed of each joint-driving actuator;
calculating, based on joint values of left and right wheel-driving actuators, a joint value and a joint speed of a wheel equivalent joint representing a degree of freedom of the wheel unit with a degree of freedom of rotation and a degree of freedom of translation of the base unit, and setting all joint values and joint speeds in an opposed-two-wheel equivalent model formed by replacing the wheel unit of the robot apparatus to the wheel equivalent joints;
finding a virtual force for obtaining the motion target, transforming the virtual force to a real force, and calculating an external force and a request torque for all of the joints in the opposed-two-wheel equivalent model;
transforming a request torque to the wheel equivalent joint to a request torque to the left and right driving wheels of the wheel unit; and
performing a torque control for each of the joints according to the obtained request torque.

* * * * *